(12) United States Patent
Tan et al.

(10) Patent No.: US 12,516,117 B2
(45) Date of Patent: Jan. 6, 2026

(54) FULLY HUMAN ANTIBODY TARGETING CD19 AND APPLICATION THEREOF

(71) Applicant: Nanjing IASO Biotechnology Co., Ltd., Nanjing (CN)

(72) Inventors: Taochao Tan, Nanjing (CN); Zhenyu Dai, Nanjing (CN); Xiangyin Jia, Nanjing (CN); Qiaoe Wei, Nanjing (CN); Yongkun Yang, Nanjing (CN)

(73) Assignee: Nanjing IASO Biotechnology Co., Ltd., Nanjing (CN)

( * ) Notice: Subject to any disclaimer, the term of this patent is extended or adjusted under 35 U.S.C. 154(b) by 177 days.

(21) Appl. No.: 17/613,367

(22) PCT Filed: May 20, 2020

(86) PCT No.: PCT/CN2020/091235
§ 371 (c)(1),
(2) Date: Nov. 22, 2021

(87) PCT Pub. No.: WO2020/233589
PCT Pub. Date: Nov. 26, 2020

(65) Prior Publication Data
US 2022/0220200 A1    Jul. 14, 2022

(30) Foreign Application Priority Data
May 20, 2019   (CN) .......................... 201910419089.8

(51) Int. Cl.
| | | |
|---|---|---|
| C07K 16/28 | (2006.01) |
| A61K 40/11 | (2025.01) |
| A61K 40/31 | (2025.01) |
| A61K 40/42 | (2025.01) |
| C07K 14/71 | (2006.01) |
| C07K 14/725 | (2006.01) |
| C12N 5/0783 | (2010.01) |
| A61K 38/00 | (2006.01) |

(52) U.S. Cl.
CPC .......... *C07K 16/2803* (2013.01); *A61K 40/11* (2025.01); *A61K 40/31* (2025.01); *A61K 40/4211* (2025.01); *C07K 14/7051* (2013.01); *C07K 14/71* (2013.01); *C12N 5/0636* (2013.01); *A61K 38/00* (2013.01); *A61K 2239/13* (2023.05); *A61K 2239/48* (2023.05); *C07K 2317/21* (2013.01); *C07K 2317/56* (2013.01); *C07K 2317/565* (2013.01); *C07K 2317/622* (2013.01); *C07K 2317/92* (2013.01)

(58) Field of Classification Search
None
See application file for complete search history.

(56) References Cited

U.S. PATENT DOCUMENTS

2023/0241212 A1    8/2023   Yang et al.

FOREIGN PATENT DOCUMENTS

| CN | 101233156 A | 7/2008 |
|---|---|---|
| CN | 101636502 A | 1/2010 |
| CN | 104558181 A | 4/2015 |
| CN | 106554414 A | 4/2017 |
| CN | 107531793 A | 1/2018 |
| CN | 107880128 A | 4/2018 |
| CN | 109293774 A | 2/2019 |
| WO | 2007/002223 A2 | 1/2007 |
| WO | 2009/054863 A2 | 4/2009 |
| WO | 2017/066136 A2 | 4/2017 |
| WO | 2022/002154 A1 | 1/2022 |
| WO | 2022/257984 A1 | 12/2022 |

OTHER PUBLICATIONS

Brudno, J.N., et al., "T Cell Expressing a Novel Fully-Human Anti-CD19 Chimeric Antigen Receptor Induce Remisssions of Advanced Lymphoma in a First-In-Humans Clinical Trial," Blood 128(22):999 (Abstract), Dec. 2016, 4 pages.
Camacho, L.H., et al., "A Phase 1, Open-Label, Multi-Center, Multiple-Dose, Dose-Escalation Study of MDX-1342 in Patients With CD19-Positive Refractory/Relapsed Chronic Lymphocytic Leukemia," Blood 114(22):Abstract 3425, Nov. 2009, 2 pages.
Written Opinion mailed Aug. 19, 2020, issued in International Application No. PCT/CN2020/091235, filed May 20, 2020, 7 pages.
Extended European Search Report mailed Jul. 21, 2023, issued in related EP Application No. 20809306.2, filed May 20, 2020, 11 pages.
Notice of Reasons for Refusal mailed Jan. 30, 2024, issued in related JP Application No. 2022-516254, filed May 20, 2020, 9 pages.
International Search Report and Written Opinion mailed Aug. 19, 2020, issued in International Application No. PCT/CN2020/091235, filed May 20, 2020, 10 pages.
Berger, C., et al., "Analysis of Transgene-Specific Immune Responses That Limit the In Vivo Persistence of Adoptively Transferred HSV-TK-Modified Donor T Cells After Allogeneic Hematopoietic Cell Transplantation," Blood 107(6):2294-2302, Mar. 2006.
Castella, M., et al., "Development of a Novel Anti-CD19 Chimeric Antigen Receptor: A Paradigm for an Affordable CAR T Cell Production at Academic Institutions," Molecular Therapy Methods & Development 12:134-144, Dec. 2018.

(Continued)

*Primary Examiner* — Gary B Nickol
*Assistant Examiner* — Cheom-Gil Cheong
(74) *Attorney, Agent, or Firm* — Christensen O'Connor Johnson Kindness PLLC

(57) ABSTRACT

Provided are a fully human antibody targeting CD19 or a single chain antibody or fragment thereof. Further provided is a chimeric antigen receptor (CAR) constructed by using a single chain antibody (scFv) derived from the fully human antibody. The fully human antibody and the CAR can be used for the construction of CAR-T cells targeting CD19. Compared with CAR-T cells using murine antibodies, the CAR-T cells have better compatibility with the human body, which is beneficial to their long-term proliferation and survival in the body.

20 Claims, 13 Drawing Sheets

Specification includes a Sequence Listing.

(56) References Cited

OTHER PUBLICATIONS

Dai, Z., et al., "Development and Functional Characterization of Novel Fully Human Anti-CD19 Chimeric Antigen Receptors for T-Cell Therapy," Journal of Cellular Physiology 236(8):5832-5847, Aug. 2020.

Gacerez, A.T., et al., "Chimeric Antigen Receptors With Human scFvs Preferentially Induce T Cell Anti-Tumor Activity Against Tumors With High B7H6 Expression," Cancer Immunology, Immunotherapy 67(5):749-759, May 2018.

Gacerez, A.T., et al., "How Chimeric Antigen Receptor Design Affects Adoptive T Cell Therapy," Journal of Cellular Physiology 231(12):2590-2598, Dec. 2016.

Lamers, C.H.J., et al., "Immune Responses to Transgene and Retroviral Vector in Patients Treated With Ex Vivo-Engineered T Cells," Blood 117(1):72-82, Jan. 2011.

Maus, M.V. and C.H. June, "Making Better Chimeric Antigen Receptors for Adoptive T-Cell Therapy," Clinical Cancer Research 22(8): 1875-1884, Apr. 2016.

Rydzek, J., et al., "Chimeric Antigen Receptor Library Screening Using a Novel NF-kB/NFAT Reporter Cell Platform," Molecular Therapy 27(2):287-299, Feb. 2019.

Sauna, Z.E., et al., "Evaluating and Mitigating the Immunogenicity of Therapeutic Proteins," Trends in Biotechnology 36(10):1068-1084, Oct. 2018.

Sommermeyer, D., et al., "Fully Human CD19-Specific Chimeric Antigen Receptors for T-Cell Therapy," Leukemia 31(10):2191-2199, Oct. 2017.

Wang, J., et al., "Acute Lymphoblastic Leukemia Relapse After CD19-Targeted Chimeric Antigen Receptor T Cell Therapy," Journal of Leukocyte Biology 102(6):1347-1356, Dec. 2017.

Xu, J., et al., "Exploratory Trial of a Biepitopic CAR T-Targeting B Cell Maturation Antigen in Relapsed/Refractory Multiple Myeloma," Proceedings of the National Academy of Sciences of the United States of America (PNAS) 116(19):9543-9551, May 2019.

SEQUENCE LISTING

<160> NUMBER OF SEQ ID NOS: 22

<210> SEQ ID NO 1
<211> LENGTH: 765
<212> TYPE: DNA
<213> ORGANISM: Artificial
<220> FEATURE:
<223> OTHER INFORMATION: #62 scFv

<400> SEQUENCE: 1

```
cagtctgtcg tgacgcagcc gccctcagtg tctggggccc cagggcagag ggtcaccatc      60
tcctgcactg ggagcagctc caacatcggg gcaggttatg atgtacactg gtaccagcaa     120
cttccaggaa cagcccccaa actcctcatc tatgagaaca ccaatcggcc ctcaggggtc     180
cctgaccgat tctctggctc caagtctggc acctcagcct ccctggccat cactgggctc     240
caggctgagg atgaggctga ttattactgc cagtcctatg acagcagcct gagtggttgg     300
agggtgttcg gcggagggac caagctgacc gtcctaggtt ctagaggtgg tggtggtagc     360
ggcggcggcg gctctggtgg tggtggatcc ctcgagatgg ccgaagtgca gctggtgcag     420
tctggggcag aggtgaaaaa gcccggggag tctctgaaga tctcctgtaa gggggtctgga   480
tacagcttta ccaactcctg gatcggatgg gtgcgccaga tgcccgggaa aggcctggag     540
tggatgggac tcatttaccc tgatgactct gataccagat acagcccatc cttccaaggc     600
caggtcacca tctcagccga cagcgccatc aacaccgcct acctgcagtg gagcagcctg     660
aaggcctcgg acaccgccat gtattactgt gcgcgccagt ctacctacat ctacggtggt     720
tactacgata cctggggtca aggtactctg gtgaccgtct cctca                     765
```

<210> SEQ ID NO 2
<211> LENGTH: 339
<212> TYPE: DNA
<213> ORGANISM: Artificial
<220> FEATURE:
<223> OTHER INFORMATION: #62 VL

<400> SEQUENCE: 2

```
cagtctgtcg tgacgcagcc gccctcagtg tctggggccc cagggcagag ggtcaccatc      60
tcctgcactg ggagcagctc caacatcggg gcaggttatg atgtacactg gtaccagcaa     120
cttccaggaa cagcccccaa actcctcatc tatgagaaca ccaatcggcc ctcaggggtc     180
cctgaccgat tctctggctc caagtctggc acctcagcct ccctggccat cactgggctc     240
caggctgagg atgaggctga ttattactgc cagtcctatg acagcagcct gagtggttgg     300
agggtgttcg gcggagggac caagctgacc gtcctaggt                            339
```

<210> SEQ ID NO 3
<211> LENGTH: 369
<212> TYPE: DNA
<213> ORGANISM: Artificial
<220> FEATURE:
<223> OTHER INFORMATION: #62 VH

<400> SEQUENCE: 3

```
atggccgaag tgcagctggt gcagtctggg gcagaggtga aaaagcccgg ggagtctctg      60
aagatctcct gtaagggggt ctggatacagc tttaccaact cctggatcgg atgggtgcgc   120
cagatgcccg ggaaaggcct ggagtggatg ggactcattt accctgatga ctctgatacc     180
agatacagcc catccttcca aggccaggtc accatctcag ccgacagcgc catcaacacc     240
gcctacctgc agtggagcag cctgaaggcc tcggacaccg ccatgtatta ctgtgcgcgc     300
```

```
cagtctacct acatctacgg tggttactac gatacctggg gtcaaggtac tctggtgacc    360
gtctcctca                                                            369
```

<210> SEQ ID NO 4
<211> LENGTH: 753
<212> TYPE: DNA
<213> ORGANISM: Artificial
<220> FEATURE:
<223> OTHER INFORMATION: #78 scFv

<400> SEQUENCE: 4

```
caggctgtgc tgactcagcc accctcggtg tctgaagccc caggcagag ggtcaccatc     60 tcctgttctg gaagcagctc caacatcgga ataatgctg taagctggta ccagcagctc    120
ccaggaaagg ctcccaaact cctcatctat tatgatgatc tgctcccctc agggtctct    180 gaccgattct ctggctccaa gtctggcacc tcagcctccc tggccatcag tgggctccag    240
tctgaggatg aggctgatta ttactgtgca gcatgggatg acagcctgaa tggttgggtg    300
ttcggcggag ggaccaaggt caccgtccta ggttctagag gtggtggtgg tagcggcggc    360
ggcggctctg gtggtggtgg atccctcgag gaggtgcagc tggtgcagtc tggagcagag    420
gtgaaaaagc ccggggagtc tctgaagatc tcctgtaagg gttctggata cagctttacc    480
agctactgga tcggctgggt gcgccagatg cccgggaaag gcctgagtg gatggggatc    540 atctatcctg gtgactctga taccagatac agcccgtcct ccaaggcca ggtcaccatc    600 tcagccgaca gtccatcag caccgcctac ctgcagtgga gcagcctgaa ggcctcggac    660
accgccatgt attactgtgc gcgcctgtct tactcttggt cttcttggta ctgggatttc    720
tggggtcaag gtactctggt gaccgtctcc tca                                  753
```

<210> SEQ ID NO 5
<211> LENGTH: 333
<212> TYPE: DNA
<213> ORGANISM: Artificial
<220> FEATURE:
<223> OTHER INFORMATION: #78 VL

<400> SEQUENCE: 5

```
caggctgtgc tgactcagcc accctcggtg tctgaagccc caggcagag ggtcaccatc     60 tcctgttctg gaagcagctc caacatcgga ataatgctg taagctggta ccagcagctc    120
ccaggaaagg ctcccaaact cctcatctat tatgatgatc tgctcccctc agggtctct    180 gaccgattct ctggctccaa gtctggcacc tcagcctccc tggccatcag tgggctccag    240
tctgaggatg aggctgatta ttactgtgca gcatgggatg acagcctgaa tggttgggtg    300
ttcggcggag ggaccaaggt caccgtccta ggt                                  333
```

<210> SEQ ID NO 6
<211> LENGTH: 363
<212> TYPE: DNA
<213> ORGANISM: Artificial
<220> FEATURE:
<223> OTHER INFORMATION: #78 VH

<400> SEQUENCE: 6

```
gaggtgcagc tggtgcagtc tggagcagag gtgaaaaagc ccggggagtc tctgaagatc     60
tcctgtaagg gttctggata cagctttacc agctactgga tcggctgggt gcgccagatg    120
cccgggaaag gcctggagtg gatggggatc atctatcctg gtgactctga taccagatac    180
```

-continued

```
agcccgtcct tccaaggcca ggtcaccatc tcagccgaca gtccatcag caccgcctac    240 ctgcagtgga gcagcctgaa ggcctcggac accgccatgt attactgtgc gcgcctgtct    300
tactcttggt cttcttggta ctgggatttc tggggtcaag gtactctggt gaccgtctcc    360
tca                                                                  363
```

<210> SEQ ID NO 7
<211> LENGTH: 255
<212> TYPE: PRT
<213> ORGANISM: Artificial
<220> FEATURE:
<223> OTHER INFORMATION: #62 scFv

<400> SEQUENCE: 7

```
Gln Ser Val Val Thr Gln Pro Pro Ser Val Ser Gly Ala Pro Gly Gln
1               5                   10                  15

Arg Val Thr Ile Ser Cys Thr Gly Ser Ser Asn Ile Gly Ala Gly
            20                  25                  30

Tyr Asp Val His Trp Tyr Gln Gln Leu Pro Gly Thr Ala Pro Lys Leu
        35                  40                  45

Leu Ile Tyr Glu Asn Thr Asn Arg Pro Ser Gly Val Pro Asp Arg Phe
    50                  55                  60

Ser Gly Ser Lys Ser Gly Thr Ser Ala Ser Leu Ala Ile Thr Gly Leu
65                  70                  75                  80

Gln Ala Glu Asp Glu Ala Asp Tyr Tyr Cys Gln Ser Tyr Asp Ser Ser
                85                  90                  95

Leu Ser Gly Trp Arg Val Phe Gly Gly Gly Thr Lys Leu Thr Val Leu
            100                 105                 110

Gly Ser Arg Gly Gly Gly Gly Ser Gly Gly Gly Ser Gly Gly Gly
        115                 120                 125

Gly Ser Leu Glu Met Ala Glu Val Gln Leu Val Gln Ser Gly Ala Glu
    130                 135                 140

Val Lys Lys Pro Gly Glu Ser Leu Lys Ile Ser Cys Lys Gly Ser Gly
145                 150                 155                 160

Tyr Ser Phe Thr Asn Ser Trp Ile Gly Trp Val Arg Gln Met Pro Gly
                165                 170                 175

Lys Gly Leu Glu Trp Met Gly Leu Ile Tyr Pro Asp Asp Ser Asp Thr
            180                 185                 190

Arg Tyr Ser Pro Ser Phe Gln Gly Gln Val Thr Ile Ser Ala Asp Ser
        195                 200                 205

Ala Ile Asn Thr Ala Tyr Leu Gln Trp Ser Ser Leu Lys Ala Ser Asp
    210                 215                 220

Thr Ala Met Tyr Tyr Cys Ala Arg Gln Ser Thr Tyr Ile Tyr Gly Gly
225                 230                 235                 240

Tyr Tyr Asp Thr Trp Gly Gln Gly Thr Leu Val Thr Val Ser Ser
                245                 250                 255
```

<210> SEQ ID NO 8
<211> LENGTH: 113
<212> TYPE: PRT
<213> ORGANISM: Artificial
<220> FEATURE:
<223> OTHER INFORMATION: #62 VL

<400> SEQUENCE: 8

```
Gln Ser Val Val Thr Gln Pro Pro Ser Val Ser Gly Ala Pro Gly Gln
1               5                   10                  15
```

Arg Val Thr Ile Ser Cys Thr Gly Ser Ser Asn Ile Gly Ala Gly
                20                  25                  30

Tyr Asp Val His Trp Tyr Gln Gln Leu Pro Gly Thr Ala Pro Lys Leu
            35                  40                  45

Leu Ile Tyr Glu Asn Thr Asn Arg Pro Ser Gly Val Pro Asp Arg Phe
 50                  55                  60

Ser Gly Ser Lys Ser Gly Thr Ser Ala Ser Leu Ala Ile Thr Gly Leu
 65                  70                  75                  80

Gln Ala Glu Asp Glu Ala Asp Tyr Tyr Cys Gln Ser Tyr Asp Ser Ser
                85                  90                  95

Leu Ser Gly Trp Arg Val Phe Gly Gly Gly Thr Lys Leu Thr Val Leu
            100                 105                 110

Gly

<210> SEQ ID NO 9
<211> LENGTH: 123
<212> TYPE: PRT
<213> ORGANISM: Artificial
<220> FEATURE:
<223> OTHER INFORMATION: #62 VH

<400> SEQUENCE: 9

Met Ala Glu Val Gln Leu Val Gln Ser Gly Ala Glu Val Lys Lys Pro
 1               5                  10                  15

Gly Glu Ser Leu Lys Ile Ser Cys Lys Gly Ser Gly Tyr Ser Phe Thr
                20                  25                  30

Asn Ser Trp Ile Gly Trp Val Arg Gln Met Pro Gly Lys Gly Leu Glu
            35                  40                  45

Trp Met Gly Leu Ile Tyr Pro Asp Asp Ser Asp Thr Arg Tyr Ser Pro
 50                  55                  60

Ser Phe Gln Gly Gln Val Thr Ile Ser Ala Asp Ser Ala Ile Asn Thr
 65                  70                  75                  80

Ala Tyr Leu Gln Trp Ser Ser Leu Lys Ala Ser Asp Thr Ala Met Tyr
                85                  90                  95

Tyr Cys Ala Arg Gln Ser Thr Tyr Ile Tyr Gly Gly Tyr Tyr Asp Thr
            100                 105                 110

Trp Gly Gln Gly Thr Leu Val Thr Val Ser Ser
            115                 120

<210> SEQ ID NO 10
<211> LENGTH: 251
<212> TYPE: PRT
<213> ORGANISM: Artificial
<220> FEATURE:
<223> OTHER INFORMATION: #78 scFv

<400> SEQUENCE: 10

Gln Ala Val Leu Thr Gln Pro Pro Ser Val Ser Glu Ala Pro Arg Gln
 1               5                  10                  15

Arg Val Thr Ile Ser Cys Ser Gly Ser Ser Asn Ile Gly Asn Asn
                20                  25                  30

Ala Val Ser Trp Tyr Gln Gln Leu Pro Gly Lys Ala Pro Lys Leu Leu
            35                  40                  45

Ile Tyr Tyr Asp Asp Leu Leu Pro Ser Gly Val Ser Asp Arg Phe Ser
 50                  55                  60

Gly Ser Lys Ser Gly Thr Ser Ala Ser Leu Ala Ile Ser Gly Leu Gln
 65                  70                  75                  80

Ser Glu Asp Glu Ala Asp Tyr Tyr Cys Ala Ala Trp Asp Asp Ser Leu
            85                  90                  95

Asn Gly Trp Val Phe Gly Gly Thr Lys Val Thr Val Leu Gly Ser
            100                 105                 110

Arg Gly Gly Gly Ser Gly Gly Gly Ser Gly Gly Gly Ser
            115                 120                 125

Leu Glu Glu Val Gln Leu Val Gln Ser Gly Ala Glu Val Lys Lys Pro
            130                 135                 140

Gly Glu Ser Leu Lys Ile Ser Cys Lys Gly Ser Gly Tyr Ser Phe Thr
145                 150                 155                 160

Ser Tyr Trp Ile Gly Trp Val Arg Gln Met Pro Gly Lys Gly Leu Glu
            165                 170                 175

Trp Met Gly Ile Ile Tyr Pro Gly Asp Ser Asp Thr Arg Tyr Ser Pro
            180                 185                 190

Ser Phe Gln Gly Gln Val Thr Ile Ser Ala Asp Lys Ser Ile Ser Thr
            195                 200                 205

Ala Tyr Leu Gln Trp Ser Ser Leu Lys Ala Ser Asp Thr Ala Met Tyr
            210                 215                 220

Tyr Cys Ala Arg Leu Ser Tyr Ser Trp Ser Trp Tyr Trp Asp Phe
225                 230                 235                 240

Trp Gly Gln Gly Thr Leu Val Thr Val Ser Ser
            245                 250

<210> SEQ ID NO 11
<211> LENGTH: 111
<212> TYPE: PRT
<213> ORGANISM: Artificial
<220> FEATURE:
<223> OTHER INFORMATION: #78 VL

<400> SEQUENCE: 11

Gln Ala Val Leu Thr Gln Pro Pro Ser Val Ser Glu Ala Pro Arg Gln
1               5                   10                  15

Arg Val Thr Ile Ser Cys Ser Gly Ser Ser Asn Ile Gly Asn Asn
            20                  25                  30

Ala Val Ser Trp Tyr Gln Gln Leu Pro Gly Lys Ala Pro Lys Leu Leu
            35                  40                  45

Ile Tyr Tyr Asp Asp Leu Leu Pro Ser Gly Val Ser Asp Arg Phe Ser
50                  55                  60

Gly Ser Lys Ser Gly Thr Ser Ala Ser Leu Ala Ile Ser Gly Leu Gln
65                  70                  75                  80

Ser Glu Asp Glu Ala Asp Tyr Tyr Cys Ala Ala Trp Asp Asp Ser Leu
            85                  90                  95

Asn Gly Trp Val Phe Gly Gly Thr Lys Val Thr Val Leu Gly
            100                 105                 110

<210> SEQ ID NO 12
<211> LENGTH: 121
<212> TYPE: PRT
<213> ORGANISM: Artificial
<220> FEATURE:
<223> OTHER INFORMATION: #78 VH

<400> SEQUENCE: 12

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Ser Tyr
            20                  25                  30

```
Trp Ile Gly Trp Val Arg Gln Met Pro Gly Lys Gly Leu Glu Trp Met
            35                  40                  45
Gly Ile Ile Tyr Pro Gly Asp Ser Asp Thr Arg Tyr Ser Pro Ser Phe
        50                  55                  60
Gln Gly Gln Val Thr Ile Ser Ala Asp Lys Ser Ile Ser Thr Ala Tyr
 65                  70                  75                  80
Leu Gln Trp Ser Ser Leu Lys Ala Ser Asp Thr Ala Met Tyr Tyr Cys
                85                  90                  95
Ala Arg Leu Ser Tyr Ser Trp Ser Trp Tyr Trp Asp Phe Trp Gly
            100                 105                 110
Gln Gly Thr Leu Val Thr Val Ser Ser
            115                 120
```

```
<210> SEQ ID NO 13
<211> LENGTH: 8
<212> TYPE: PRT
<213> ORGANISM: Artificial
<220> FEATURE:
<223> OTHER INFORMATION: #62 HCDR1

<400> SEQUENCE: 13

Gly Tyr Ser Phe Thr Asn Ser Trp
1               5

<210> SEQ ID NO 14
<211> LENGTH: 8
<212> TYPE: PRT
<213> ORGANISM: Artificial
<220> FEATURE:
<223> OTHER INFORMATION: #62 HCDR2

<400> SEQUENCE: 14

Ile Tyr Pro Asp Asp Ser Asp Thr
1               5

<210> SEQ ID NO 15
<211> LENGTH: 14
<212> TYPE: PRT
<213> ORGANISM: Artificial
<220> FEATURE:
<223> OTHER INFORMATION: #62 HCDR3

<400> SEQUENCE: 15

Ala Arg Gln Ser Thr Tyr Ile Tyr Gly Gly Tyr Tyr Asp Thr
1               5                   10

<210> SEQ ID NO 16
<211> LENGTH: 9
<212> TYPE: PRT
<213> ORGANISM: Artificial
<220> FEATURE:
<223> OTHER INFORMATION: #62 LCDR1

<400> SEQUENCE: 16

Ser Ser Asn Ile Gly Ala Gly Tyr Asp
1               5

<210> SEQ ID NO 17
<211> LENGTH: 12
<212> TYPE: PRT
<213> ORGANISM: Artificial
<220> FEATURE:
<223> OTHER INFORMATION: #62 LCDR3
```

```
<400> SEQUENCE: 17

Gln Ser Tyr Asp Ser Ser Leu Ser Gly Trp Arg Val
1               5                   10

<210> SEQ ID NO 18
<211> LENGTH: 8
<212> TYPE: PRT
<213> ORGANISM: Artificial
<220> FEATURE:
<223> OTHER INFORMATION: #78 HCDR1

<400> SEQUENCE: 18

Gly Tyr Ser Phe Thr Ser Tyr Trp
1               5

<210> SEQ ID NO 19
<211> LENGTH: 8
<212> TYPE: PRT
<213> ORGANISM: Artificial
<220> FEATURE:
<223> OTHER INFORMATION: #78 HCDR2

<400> SEQUENCE: 19

Ile Tyr Pro Gly Asp Ser Asp Thr
1               5

<210> SEQ ID NO 20
<211> LENGTH: 14
<212> TYPE: PRT
<213> ORGANISM: Artificial
<220> FEATURE:
<223> OTHER INFORMATION: #78 HCDR3

<400> SEQUENCE: 20

Ala Arg Leu Ser Tyr Ser Trp Ser Ser Trp Tyr Trp Asp Phe
1               5                   10

<210> SEQ ID NO 21
<211> LENGTH: 8
<212> TYPE: PRT
<213> ORGANISM: Artificial
<220> FEATURE:
<223> OTHER INFORMATION: #78 LCDR1

<400> SEQUENCE: 21

Ser Ser Asn Ile Gly Asn Asn Ala
1               5

<210> SEQ ID NO 22
<211> LENGTH: 11
<212> TYPE: PRT
<213> ORGANISM: Artificial
<220> FEATURE:
<223> OTHER INFORMATION: #78 LCDR3

<400> SEQUENCE: 22

Ala Ala Trp Asp Asp Ser Leu Asn Gly Trp Val
1               5                   10
```

FULLY HUMAN ANTIBODY TARGETING CD19 AND APPLICATION THEREOF

CROSS-REFERENCES TO RELATED APPLICATIONS

This application is a National Stage of International Application No. PCT/CN2020/091235, filed May 20, 2020, which claims priority to Chinese Application No. 201910419089.8, filed May 20, 2019, the disclosures of which are incorporated herein by reference in their entirety.

FIELD

The present invention relates to a fully human antibody targeting CD19 and further to a chimeric antigen receptor (CAR) comprising a single chain antibody (scFv) of the fully human antibody. The fully human antibody, the scFv thereof and the CAR can be used for constructing CAR-T cells targeting CD19.

BACKGROUND

In recent years, cell immunotherapy technology, especially chimeric antigen receptor T cell (CAR-T) technology, has made breakthrough progress. In 2017, Kymriah (Tisagenlecleucel) of Novartis and Yescarta of Kite Pharma were successively approved for marketing by U.S. FDA. Kymriah is the world's first approved CAR-T therapeutic product for treatment of patients aged 3 to 25 years with acute lymphoblastic leukemia and adults with relapsed or refractory diffuse large B cell lymphoma (DLBCL). Yescarta is the second approved CAR-T product in the world for treatment of relapsed or refractory B cell lymphoma and non-Hodgkin's lymphoma in adults. FIG. 1 shows the schematic molecular structure of a common CAR.

The CAR-T technology has opened up a new era of tumor treatment due to its completely different treatment principles from traditional treatments such as surgery, chemotherapy, and radiotherapy, as well as its revolutionary therapeutic effects on refractory and relapsed hematological malignancies. At present, a large number of clinical trials on CAR-T have been carried out in the world, and China and the United States are the countries with the largest number of related clinical trials.

CD19 is one of the popular targets for CAR-T therapy for treatment of B-lymphocyte tumor. Thanks to its confirmed efficacy and controllable side effects, CD19 CAR-T medication represents the largest share in drugs commercially available or under investigation. With the deep clinical research, there are more and more evidences that CD19 CAR-T therapy has a good short-term effect, but over time, about 50% of patients receiving this therapy will relapse. There are many causes for relapse, which are mainly divided into CD19 antigen-negative relapse and CD19 antigen-positive relapse. CD19 antigen-positive relapse is mainly attributable to the short survival time of CAR-T cells in patients. According to existing studies on patients who received CAR-T infusion, the production of anti-drug antibody (ADA) or cytotoxic T lymphocyte (CTL) against the heterologous antibody used in CAR-T in human body may be the main reason for the rapid elimination of CAR-T cells in some patients.

Currently, the two commercially available products and most of those in clinical trials use heterologous antibodies to recognize CD19 antigen. For example, Kymriah and Yescarta both use murine antibodies and LCAR-B38M (Nanjing Legend Biotechnology) uses alpaca-derived antibodies. Fully human antibodies have become a mainstream direction in the field of antibody drug development due to their lower immunogenicity than heterologous antibodies. By the same token, the application of fully human antibodies to CAR-T products can also reduce the immunogenicity of CAR-T cells, prolong the survival time of CAR-T cells in the human body and enhance the long-term efficacy of CAR-T products. Therefore, the development of fully human CD19 antibodies is of great significance for the development of next-generation CAR-T products with longer survival time in the body and better long-term efficacy.

SUMMARY

In one aspect, provided herein is a fully human antibody targeting CD19 or a single chain antibody or fragment thereof, wherein the fully human antibody comprises a light chain variable region comprising LCDR1, LCDR2, and LCDR3, and a heavy chain variable region comprising HCDR1, HCDR2, and HCDR3, and the LCDR1, LCDR2, LCDR3, HCDR1, HCDR2, and HCDR3 are selected from one of the following combinations:

(1) the amino acid sequence of the LCDR1 is SSNIGAGYD (SEQ ID NO: 16);
the amino acid sequence of the LCDR2 is ENT;
the amino acid sequence of the LCDR3 is QSYDSSLSGWRV (SEQ ID NO:17);
the amino acid sequence of the HCDR1 is GYSFTNSW (SEQ ID NO:13);
the amino acid sequence of the HCDR2 is IYPDDSDT (SEQ ID NO:14); and
the amino acid sequence of the HCDR3 is ARQSTYIYGGYYDT (SEQ ID NO: 15); and
(2) the amino acid sequence of the LCDR1 is SSNIGNNA (SEQ ID NO:21);
the amino acid sequence of the LCDR2 is YDD;
the amino acid sequence of the LCDR3 is AAWDDSLNGWV (SEQ ID NO:22);
the amino acid sequence of the HCDR1 is GYSFTSYW (SEQ ID NO:18);
the amino acid sequence of the HCDR2 is IYPGDSDT (SEQ ID NO:19); and
the amino acid sequence of the HCDR3 is ARLSYSWSSWYWDF (SEQ ID NO:20).

In some embodiments, the light chain variable region comprises an amino acid sequence set forth in SEQ ID NO: 8, and the heavy chain variable region comprises an amino acid sequence set forth in SEQ ID NO: 9; or the light chain variable region comprises an amino acid sequence set forth in SEQ ID NO: 11, and the heavy chain variable region comprises an amino acid sequence set forth in SEQ ID NO: 12.

In some embodiments, the single chain antibody comprises an amino acid sequence set forth in SEQ ID NO: 7 or 10.

In another aspect, provided herein is a chimeric antigen receptor targeting CD19 comprising a single chain antibody targeting CD19, wherein the single chain antibody comprises a light chain variable region comprising LCDR1, LCDR2, and LCDR3, and a heavy chain variable region comprising HCDR1, HCDR2, and HCDR3, wherein the LCDR1, LCDR2, LCDR3, HCDR1, HCDR2, and HCDR3 are selected from one of the following combinations:

(1) the amino acid sequence of the LCDR1 is SSNIGAGYD (SEQ ID NO: 16);

the amino acid sequence of the LCDR2 is ENT;
the amino acid sequence of the LCDR3 is QSYDSSLSGWRV (SEQ ID NO:17);
the amino acid sequence of the HCDR1 is GYSFTNSW (SEQ ID NO:13);
the amino acid sequence of the HCDR2 is IYPDDSDT (SEQ ID NO: 14); and
the amino acid sequence of the HCDR3 is ARQSTYIYG-GYYDT (SEQ ID NO: 15); and (2) the amino acid sequence of the LCDR1 is SSNIGNNA (SEQ ID NO:21);
the amino acid sequence of the LCDR2 is YDD;
the amino acid sequence of the LCDR3 is AAWDD-SLNGWV (SEQ ID NO:22);
the amino acid sequence of the HCDR1 is GYSFTSYW (SEQ ID NO:18);
the amino acid sequence of the HCDR2 is IYPGDSDT (SEQ ID NO: 19); and
the amino acid sequence of the HCDR3 is ARLSYSWSS-WYWDF (SEQ ID NO:20).

In some embodiments, the light chain variable region comprises an amino acid sequence set forth in SEQ ID NO: 8, and the heavy chain variable region comprises an amino acid sequence set forth in SEQ ID NO: 9; or the light chain variable region comprises an amino acid sequence set forth in SEQ ID NO: 11, and the heavy chain variable region comprises an amino acid sequence set forth in SEQ ID NO: 12.

In some embodiments, the single chain antibody comprises an amino acid sequence set forth in SEQ ID NO: 7 or 10.

In another aspect, provided herein is a modified T cell expressing the aforementioned chimeric antigen receptor.

In another aspect, provided herein is a drug for treating a tumor expressing CD19 on cell surface, comprising the aforementioned T cell.

In another aspect, provided herein is an isolated nucleic acid molecule encoding the aforementioned fully human antibody or the single chain antibody or fragment thereof.

In some embodiments, a sequence encoding the light chain variable region of the fully human antibody comprises a nucleotide sequence set forth in SEQ ID NO: 2, and a sequence encoding the heavy chain variable region comprises a nucleotide sequence set forth in SEQ ID NO: 3; or a sequence encoding the light chain variable region of the fully human antibody comprises a nucleotide sequence set forth in SEQ ID NO: 5, and a sequence encoding the heavy chain variable region comprises a nucleotide sequence set forth in SEQ ID NO: 6.

In some embodiments, the sequence encoding the single chain antibody comprises a nucleotide sequence set forth in SEQ ID NO: 1 or 4.

In another aspect, provided herein is an expression vector comprising the aforementioned nucleic acid molecule.

In some embodiments, the expression vector further comprises a sequence encoding epidermal growth factor receptor (EGFR) or truncated EGFR (tEGFR).

Compared with murine antibodies or humanized murine antibodies, the fully human antibody provided herein has lower immunogenicity and higher application potential in antibody drug or CAR-T. Compared with CAR-T cells constructed using murine antibodies, the CAR-T cells constructed using the fully human antibody provided herein have better compatibility with the human body, which is beneficial to their long-term proliferation and survival in the body.

DETAILED DESCRIPTION

Figure 1:
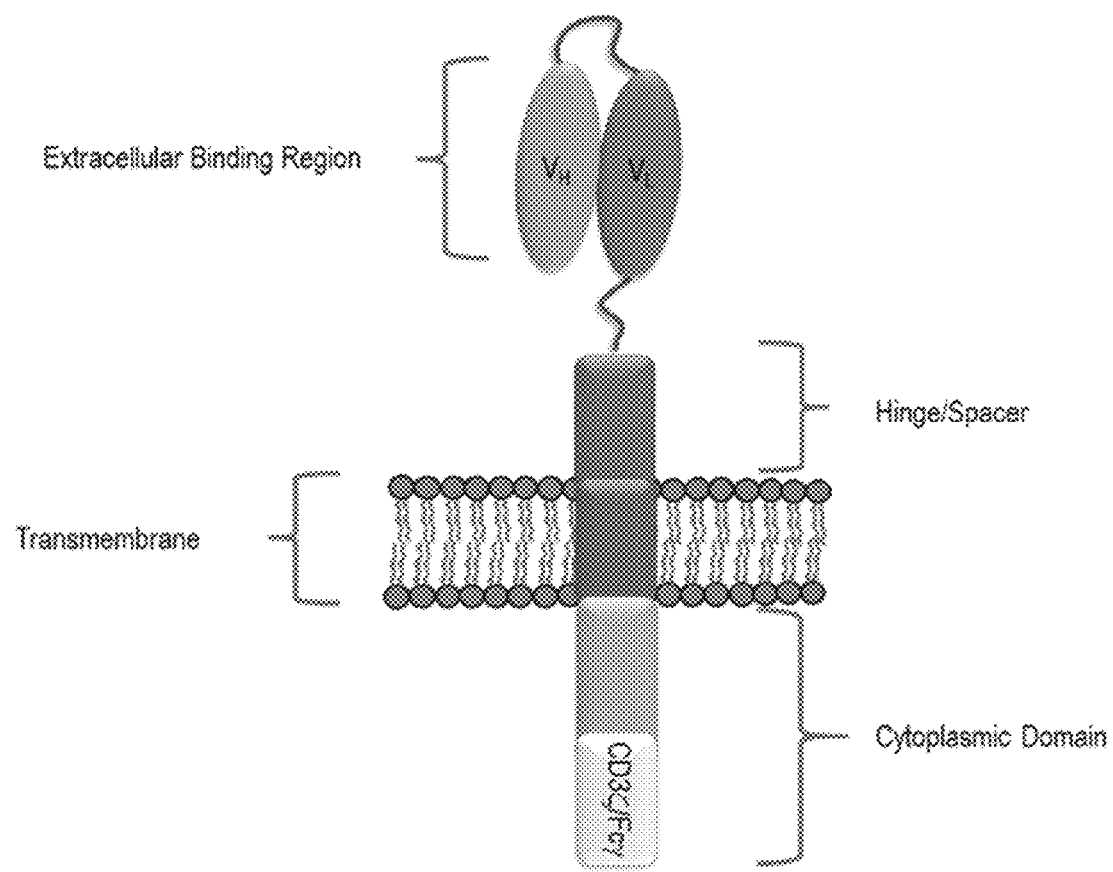
FIG. 1 is a schematic structural diagram of a chimeric antigen receptor (CAR) expressed on cell surface. The CAR comprises: an extracellular binding region for binding to specific target antigens such as CD19, typically in the form of a single chain antibody (scFv); a hinge region between the cell membrane and the extracellular binding region; and a cytoplasmic domain for transducing binding signals of the extracellular binding region and activating cells.

All technical and scientific terms used herein have the meaning commonly understood by one of ordinary skill in the art, unless otherwise specified.

Antibodies refer to immunoglobulins secreted by plasma cells (effector B cells) and used by the body's immune system to neutralize foreign substances (polypeptides, viruses, bacteria, etc.). The foreign substance is accordingly referred to as an antigen. The basic structure of an antibody molecule is a tetramer consisting of two identical heavy chains and two identical light chains. According to the difference in conservation of amino acid sequences, the heavy and light chains are divided to have a variable region (V) at the amino terminal and a constant region (C) at the carboxyl terminal. The variable regions of one heavy chain and one light chain interact to form an antigen-binding site (Fv). In the variable region, some regions have more variable composition and arrangement order of amino acid residues than other regions (framework region, FR), and are called hypervariable regions (HVRs). The hypervariable region is actually the key site for binding of antibody to antigen. Since these hypervariable region sequences are complementary to the antigenic determinant, they are also called complementarity-determining region (CDR). The heavy and light chains each have three CDRs, called HCDR1, HCDR2, HCDR3, and LCDR1, LCDR2, and LCDR3, respectively.

Single chain antibody (single chain fragment variable, scFv) is composed of the heavy chain variable region and light chain variable region of the antibody connected into a peptide chain by a short peptide. With proper folding, the variable regions from the heavy and light chains interact via non-covalent bonds to form the Fv segment, so that scFv well retains the affinity to the antigen.

Murine antibodies are antibodies produced by murine against specific antigens, usually refer to antibodies produced by mouse B lymphocytes. In most cases, the murine antibody is a monoclonal antibody produced by hybridoma cells. The fully human antibody of the present invention is obtained by screening human phage antibody libraries, which, compared with a murine antibody, reduces the immunogenicity and is more beneficial to therapeutic use in the human body.

Chimeric antigen receptor (CAR), also known as chimeric T-cell receptor and chimeric immune receptor, is an engineered protein receptor molecule that confers a desired specificity to immune effector cells, such as the ability to bind to a specific tumor antigen. A chimeric antigen receptor is usually composed of an extracellular antigen-binding domain, a transmembrane domain, and an intracellular signalling domain. In most cases, the antigen-binding domain is an scFv sequence, which is responsible for recognizing and binding to a specific antigen. The intracellular signalling domain usually comprises an immunoreceptor tyrosine-based activation motif (ITAM), such as the signalling domain derived from CD3ξ molecules, which is responsible for activating immune effector cells to produce cytotoxicity. In addition, the chimeric antigen receptor may also comprise a signal peptide responsible for intracellular localization of nascent proteins at the amino terminal, and a hinge region between the antigen binding domain and the transmembrane domain. In addition to the signalling domain, the intracellular signalling domain may also comprise, for example, a costimulatory domain derived from 4-1BB molecules.

CAR-T cell refers to a T cell expressing CAR, which is usually obtained by transduction of T cells with an expression vector encoding CAR. Common expression vectors are viral vectors, such as lentiviral expression vectors. T cells modified by the chimeric antigen receptor (CAR-Ts) are not constrained by major histocompatibility complexes and have specific targeting killing activity and the ability of persistent proliferation.

CD19 is a marker molecule on the surface of B lymphocytes and plays a role in regulating B cell activation and development. CD19 is expressed not only in normal B cells but also in many B cell malignancies, which constitutes the basis of clinical treatment of B cell-related tumors using CAR-T targeting CD19.

Overview of Our Study:

We used a large phage antibody library to screen fully human CD19-specific antibodies and evaluated the effectiveness and safety of these antibodies in killing tumor cells at CAR-T level through functional experiments. Finally, we obtained a number of fully human antibody clones with good specificity and effectiveness. These fully human antibodies will be further evaluated experimentally to select the optimal candidate clone for CD19 CAR-T product development.

Figure 2:
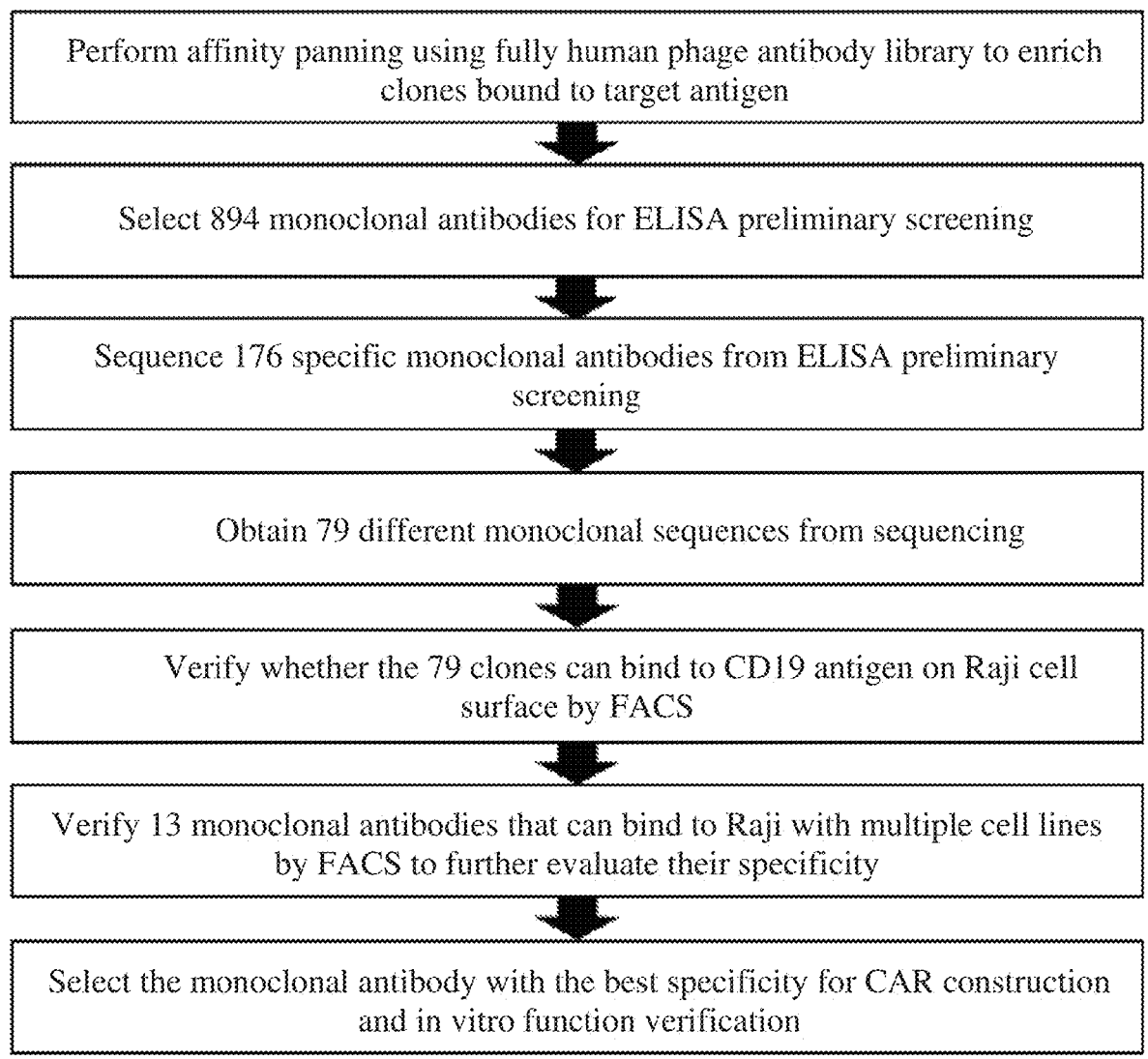
FIG. 2 shows a general procedure for screening a specific antibody targeting CD19 from a phage antibody library according to the present invention.

With different antibody libraries, after recombinant CD19 protein panning and alternating protein/cell panning, a total of 894 monoclonal antibodies were selected for ELISA-based preliminary screening, and among them, 176 monoclonal antibodies specifically bound to CD19-hFc-Bio protein but not to the control protein BCMA-hFc-Bio (protein panning/ELISA-based preliminary screening). After sequencing, 79 different monoclonal sequences were obtained. Subsequently, the binding of these monoclonal antibodies to a CD19-positive cell line Raji and a CD19 knockout Raji cell line (Raji-CD19ko) was detected by flow cytometry (FACS), and 13 monoclonal antibodies that specifically bind to CD19 antigen on cell surface were screened out. These 13 antibodies were further identified by flow cytometry (FACS) with several CD19-positive cell lines (Raji, JVM-2, K562-CD19) and negative cell lines (Raji-CD19ko, Jurkat, K562), and among them, two clones (#62 and #78) showed good specificity across multiple cell lines. The two clones (#62 and #78) were constructed into CAR-Ts for in vitro function experiments. The results showed that these clones can have the NFAT signalling pathway activated by CD19-positive cell lines at CAR-T level, express CD107a protein (a marker showing initiation of cytotoxicity of CAR-T cells), and specifically kill CD19-positive cell lines but not CD19-negative cell lines, similar to the control murine monoclonal antibody FMC63 CAR-T in terms of activity and specificity. The acquisition and preliminary functional verification of these clones laid a foundation for the subsequent development of fully human CD19 CAR-T products. The overall procedure of the project is shown in FIG. 2.

The sequencing results of the above 2 clones are as follows:

\# 62 scFv DNA sequence: 765bp

SEQ ID NO: 1

CAGTCTGTCGTGACGCAGCCGCCCTCAGTGTCTGGGGCCCCAGGGCAGAGGGTC

ACCATCTCCTGCACTGGGAGCAGCTCCAACATCGGGGCAGGTTATGATGTACACTGG

TACCAGCAACTTCCAGGAACAGCCCCCAAACTCCTCATCTATGAGAACACCAATCGG

CCCTCAGGGGTCCCTGACCGATTCTCTGGCTCCAAGTCTGGCACCTCAGCCTCCCTG

```
GCCATCACTGGGCTCCAGGCTGAGGATGAGGCTGATTATTACTGCCAGTCCTATGAC

AGCAGCCTGAGTGGTTGGAGGGTGTTCGGCGGAGGGACCAAGCTGACCGTCCTAGG

TTCTAGAGGTGGTGGTGGTAGCGGCGGCGGCGGCTCTGGTGGTGGTGGATCCCTCGA

GATGGCCGAAGTGCAGCTGGTGCAGTCTGGGGCAGAGGTGAAAAAGCCCGGGGAGT

CTCTGAAGATCTCCTGTAAGGGGTCTGGATACAGCTTTACCAACTCCTGGATCGGAT

GGGTGCGCCAGATGCCCGGGAAAGGCCTGGAGTGGATGGGACTCATTTACCCTGAT

GACTCTGATACCAGATACAGCCCATCCTTCCAAGGCCAGGTCACCATCTCAGCCGAC

AGCGCCATCAACACCGCCTACCTGCAGTGGAGCAGCCTGAAGGCCTCGGACACCGC

CATGTATTACTGTGCGCGCCAGTCTACCTACATCTACGGTGGTTACTACGATACCTGG

GGTCAAGGTACTCTGGTGACCGTCTCCTCA
```

62 VL DNA sequence: 339bp
SEQ ID NO: 2

```
CAGTCTGTCGTGACGCAGCCGCCCTCAGTGTCTGGGGCCCCAGGGCAGAGGGTC

ACCATCTCCTGCACTGGGAGCAGCTCCAACATCGGGGCAGGTTATGATGTACACTGG

TACCAGCAACTTCCAGGAACAGCCCCCAAACTCCTCATCTATGAGAACACCAATCGG

CCCTCAGGGGTCCCTGACCGATTCTCTGGCTCCAAGTCTGGCACCTCAGCCTCCCTG

GCCATCACTGGGCTCCAGGCTGAGGATGAGGCTGATTATTACTGCCAGTCCTATGAC

AGCAGCCTGAGTGGTTGGAGGGTGTTCGGCGGAGGGACCAAGCTGACCGTCCTAGGT
```

62 VH DNA sequence: 369bp
SEQ ID NO: 3

```
ATGGCCGAAGTGCAGCTGGTGCAGTCTGGGGCAGAGGTGAAAAAGCCCGGGGA

GTCTCTGAAGATCTCCTGTAAGGGGTCTGGATACAGCTTTACCAACTCCTGGATCGG

ATGGGTGCGCCAGATGCCCGGGAAAGGCCTGGAGTGGATGGGACTCATTTACCCTG

ATGACTCTGATACCAGATACAGCCCATCCTTCCAAGGCCAGGTCACCATCTCAGCCG

ACAGCGCCATCAACACCGCCTACCTGCAGTGGAGCAGCCTGAAGGCCTCGGACACC

GCCATGTATTACTGTGCGCGCCAGTCTACCTACATCTACGGTGGTTACTACGATACCT

GGGGTCAAGGTACTCTGGTGACCGTCTCCTCA
```

78 scFv DNA sequence: 753bp
SEQ ID NO: 4

```
CAGGCTGTGCTGACTCAGCCACCCTCGGTGTCTGAAGCCCCCAGGCAGAGGGTC

ACCATCTCCTGTTCTGGAAGCAGCTCCAACATCGGAAATAATGCTGTAAGCTGGTAC

CAGCAGCTCCCAGGAAAGGCTCCCAAACTCCTCATCTATTATGATGATCTGCTCCCC

TCAGGGGTCTCTGACCGATTCTCTGGCTCCAAGTCTGGCACCTCAGCCTCCCTGGCC

ATCAGTGGGCTCCAGTCTGAGGATGAGGCTGATTATTACTGTGCAGCATGGGATGAC

AGCCTGAATGGTTGGGTGTTCGGCGGAGGGACCAAGGTCACCGTCCTAGGTTCTAGA

GGTGGTGGTGGTAGCGGCGGCGGCGGCTCTGGTGGTGGTGGATCCCTCGAGGAGGT

GCAGCTGGTGCAGTCTGGAGCAGAGGTGAAAAAGCCCGGGGAGTCTCTGAAGATCT

CCTGTAAGGGTTCTGGATACAGCTTTACCAGCTACTGGATCGGCTGGGTGCGCCAGA

TGCCCGGGAAAGGCCTGGAGTGGATGGGGATCATCTATCCTGGTGACTCTGATACCA

GATACAGCCCGTCCTTCCAAGGCCAGGTCACCATCTCAGCCGACAAGTCCATCAGCA

CCGCCTACCTGCAGTGGAGCAGCCTGAAGGCCTCGGACACCGCCATGTATTACTGTG

CGCGCCTGTCTTACTCTTGGTCTTCTTGGTACTGGGATTTCTGGGGTCAAGGTACTCT

GGTGACCGTCTCCTCA
```

-continued

78 VL DNA sequence: 333bp
SEQ ID NO: 5

CAGGCTGTGCTGACTCAGCCACCCTCGGTGTCTGAAGCCCCCAGGCAGAGGGTC

ACCATCTCCTGTTCTGGAAGCAGCTCCAACATCGGAAATAATGCTGTAAGCTGGTAC

CAGCAGCTCCCAGGAAAGGCTCCCAAACTCCTCATCTATTATGATGATCTGCTCCCC

TCAGGGGTCTCTGACCGATTCTCTGGCTCCAAGTCTGGCACCTCAGCCTCCCTGGCC

ATCAGTGGGCTCCAGTCTGAGGATGAGGCTGATTATTACTGTGCAGCATGGGATGAC

AGCCTGAATGGTTGGGTGTTCGGCGGAGGGACCAAGGTCACCGTCCTAGGT

78 VH DNA sequence: 363bp
SEQ ID NO: 6

GAGGTGCAGCTGGTGCAGTCTGGAGCAGAGGTGAAAAAGCCCGGGGAGTCTCTG

AAGATCTCCTGTAAGGGTTCTGGATACAGCTTTACCAGCTACTGGATCGGCTGGGTG

CGCCAGATGCCCGGGAAAGGCCTGGAGTGGATGGGGATCATCTATCCTGGTGACTCT

GATACCAGATACAGCCCGTCCTTCCAAGGCCAGGTCACCATCTCAGCCGACAAGTCC

ATCAGCACCGCCTACCTGCAGTGGAGCAGCCTGAAGGCCTCGGACACCGCCATGTAT

TACTGTGCGCGCCTGTCTTACTCTTGGTCTTCTTGGTACTGGGATTTCTGGGGTCAAG

GTACTCTGGTGACCGTCTCCTCA

62 scFv amino acid sequence: 255aa
SEQ ID NO: 7

QSVVTQPPSVSGAPGQRVTISCTGSSSNIGAGYDVHWYQQLPGTAPKLLIYENTNRPS

GVPDRFSGSKSGTSASLAITGLQAEDEADYYCQSYDSSLSGWRVFGGGTKLTVLGSRGG

GGSGGGGSGGGGSLEMAEVQLVQSGAEVKKPGESLKISCKGSGYSFTNSWIGWVRQMP

GKGLEWMGLIYPDDSDTRYSPSFQGQVTISADSAINTAYLQWSSLKASDTAMYYCARQS

TYIYGGYYDTWGQGTLVTVSS

62 VL amino acid sequence: 113aa
SEQ ID NO: 8

QSVVTQPPSVSGAPGQRVTISCTGSSSNIGAGYDVHWYQQLPGTAPKLLIYENTNRPS

GVPDRFSGSKSGTSASLAITGLQAEDEADYYCQSYDSSLSGWRVFGGGTKLTVLG

62 VH amino acid sequence: 123aa
SEQ ID NO: 9

MAEVQLVQSGAEVKKPGESLKISCKGSGYSFTNSWIGWVRQMPGKGLEWMGLIYP

DDSDTRYSPSFQGQVTISADSAINTAYLQWSSLKASDTAMYYCARQSTYIYGGYYDTW

GQGTLVTVSS

78 scFv amino acid sequence: 251aa
SEQ ID NO: 10

QAVLTQPPSVSEAPRQRVTISCSGSSSNIGNNAVSWYQQLPGKAPKLLIYYDDLLPSG

VSDRFSGSKSGTSASLAISGLQSEDEADYYCAAWDDSLNGWVFGGGTKVTVLGSRGGG

GSGGGGSGGGGSLEEVQLVQSGAEVKKPGESLKISCKGSGYSFTSYWIGWVRQMPGKG

LEWMGIIYPGDSDTRYSPSFQGQVTISADKSISTAYLQWSSLKASDTAMYYCARLSYSW

SSWYWDFWGQGTLVTVSS

78 VL amino acid sequence: 111aa
SEQ ID NO: 11

QAVLTQPPSVSEAPRQRVTISCSGSSSNIGNNAVSWYQQLPGKAPKLLIYYDDLLPSG

VSDRFSGSKSGTSASLAISGLQSEDEADYYCAAWDDSLNGWVFGGGTKVTVLG

78 VH amino acid sequence: 121aa
SEQ ID NO: 12

EVQLVQSGAEVKKPGESLKISCKGSGYSFTSYWIGWVRQMPGKGLEWMGIIYPGDS

DTRYSPSFQGQVTISADKSISTAYLQWSSLKASDTAMYYCARLSYSWSSWYWDFWGQG

TLVTVSS

The amino acid sequences of the corresponding antigenic determinants are shown in the table below:

TABLE 1

Amino acid sequences of antigenic determinants

| Clone | HCDR1 | HCDR2 | HCDR3 | LCDR1 | LCDR2 | LCDR3 |
|---|---|---|---|---|---|---|
| ##62 | GYSFTN SW (SEQ ID NO: 13) | IYPDDSD T (SEQ ID NO: 14) | ARQSTYIY GGYYDT (SEQ ID NO: 15) | SSNIGAG YD (SEQ ID NO: 16) | ENT | QSYDSSL SGWRV (SEQ ID NO: 17) |
| ##78 | GYSFTS YW (SEQ ID NO: 18) | IYPGDSD T (SEQ ID NO: 19) | ARLSYSWS SWYWDF (SEQ ID NO: 20) | SSNIGNN A (SEQ ID NO: 21) | YDD | AAWDDS LNGWV (SEQ ID NO: 22) |

The present invention is to be described in detail below with reference to specific examples.

Example 1. Construction of CD19 Knockout Cell Line Raji-CD19Ko

To select specific monoclonal antibodies from phage antibody libraries (fully human antibody libraries, including native libraries and semi-synthetic libraries), the phage antibody libraries can be brought into contact with cells expressing the target antigen and those not expressing the target antigen respectively, to screen out or identify specific antibodies based on binding ability. It is preferred to construct cells with the coding gene of the target antigen knocked out. Thus, the difference between a pair of cells lies mainly in the knocked-out gene. This pair of cells will play an important role in monoclonal antibody binding specificity identification and affinity panning. To this end, we used CRISPR/Cas9 technology to knock out the CD19 gene from Raji cells with high expression of CD19, and obtained CD19-negative monoclonal Raji-CD19ko cells through monoclonal screening.

The brief experimental steps are as follows:
1) design plurality of sgRNA sequences (sgRNA1 to sgRNA6), and synthesize primer;
2) prepare sgRNA transcription template by PCR;
3) perform sgRNA reverse transcription and column purification;
4) transfect sgRNA/Cas9 RNP into Raji cells by electroporation;
5) detect gene knockout efficiency of different sgRNAs by using FACS, select cell pools with higher knockout efficiency, and isolate monoclonal cells by limiting dilution assay;
6) identify monoclonal cells by FACS and characterize knockout efficiency in term of molecular biology; and
7) construct and preserve of Raji-CD19ko cell library.

Main Materials and Reagents:
OligoDNA for preparation of sgRNA, Sangon Biotech (Shanghai) Co., Ltd.
TranscriptAid T7 High Yield Transcription Kit, Thermo, K0441
TrueCut™ Cas9 Protein v2, thermo, A36498
PE anti-human CD19 Antibody, Biolegend, 302254

Figure 3:
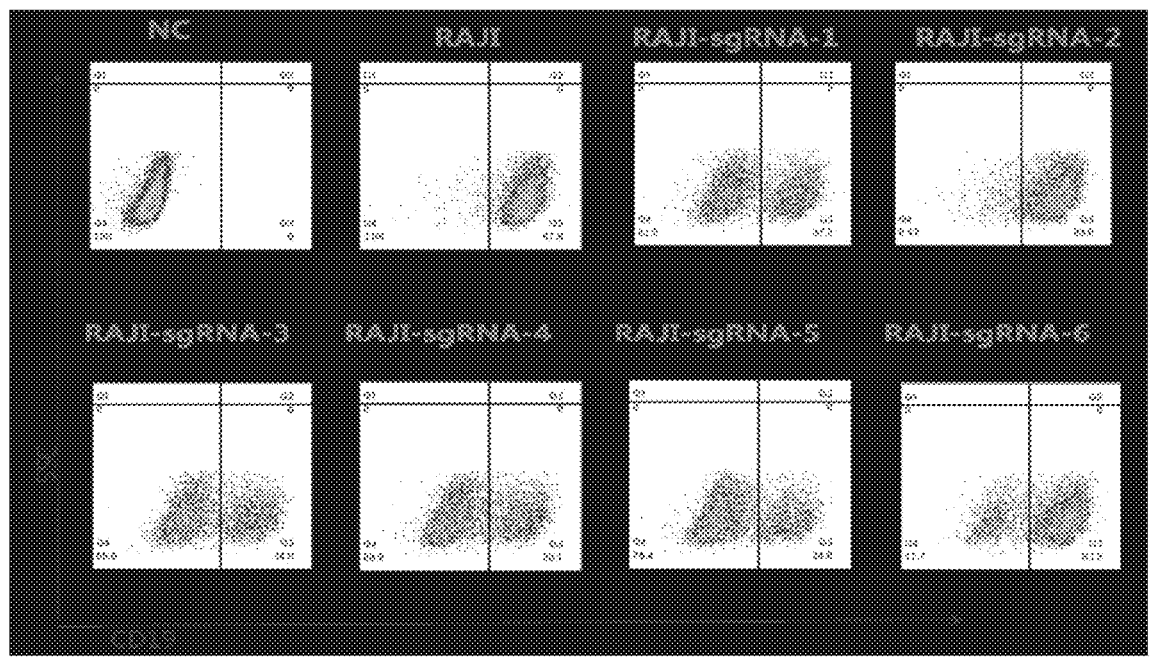
FIG. 3 shows the results of flow cytometry of cell clones obtained from Raji cells with knockouts using different sgRNAs.

Experimental Results:
As shown in FIG. 3, the cells corresponding to sgRNA5 showed the highest CD19 knockout efficiency, with 75.4% of CD19 being knocked out. Therefore, we selected the cell pool transfected with sgRNA5 by electroporation for monoclonal screening. The monoclonal cells were isolated from the cell pool by limiting dilution assay, and after the monoclonal cells were proliferated, the CD19 expression of these monoclonal cells was detected by FACS. The results are shown in Table 2, wherein clones Raji-CD19ko-1, 11 and 14 had basically undetectable CD19 expression, and they could be considered as the monoclonal cells with successful knockout. These three clones were cultured and cryopreserved. We used clone 1 in the subsequent studies.

TABLE 2

Expression of CD19 in Raji cells with CD19 knockout

| Number | Percentage of CD19+ in viable cells |
|---|---|
| Raji-CD19ko-1 | 0.055 |
| Raji-CD19ko-7 | 37.5 |
| Raji-CD19ko-8 | 42.8 |
| Raji-CD19ko-11 | 0.074 |
| Raji-CD19ko-14 | 0.28 |
| Raji | 98.2 |

Example 2. Enrichment of Specific Antibody Clones Targeting CD19 Protein from Phage Antibody Library by Affinity Panning The desired specific antibody clones were enriched from the phage antibody libraries using appropriate negative and positive panning strategies.

Construction of Phage Antibody Library

We constructed a semi-synthetic phage antibody library, which was used together with the native library to solve the problem that the native library might lack high-affinity CD19 antibody clones. CD19 is an antigen normally expressed by B lymphocytes in the human body. For such an antigen, the body will inactivate those B cells that can express CD19 antibodies during their development through the mechanism of clone screening, resulting in the lack of high-affinity antibodies against such an antigen in a normal human body. Clone screening is the normal self-recognition and self-protection mechanism of the organism. However, the most commonly used phage antibody library is a native library, which is constructed by directly cloning antibody genes in healthy human lymphocytes, where there is likely to be a lack of antibody clones against antigens such as CD19 normally present in the human body. In view of this, we constructed not only the native library but also the semi-synthetic antibody library when we constructed antibody libraries. The semi-synthetic antibody library consists of light and heavy chain FR1-FR3 from a native antibody sequence and an artificially designed heavy chain CDR3, which can greatly increase antibody diversity and enhance the chance of screening high-affinity antibodies against antigens normally present in the body (such as CD19).

CD19 Protein Panning

A phage pool enriched with the target antibody clones was obtained through multiple rounds of panning with BCMA-Fc as the negative panning protein and CD19-Fc as the positive panning protein. The experimental steps are outlined below:

1) coat the target antigen (CD19-Fc) or a control antigen (BCMA-Fc) with Fc tag on a high-binding 96-well ELISA plate, and block the ELISA plate with blocking buffer;
2) add a phage library (containing $1 \times 10^{12}$ phage particles) to incubate with the control antigen so as to remove phage antibody clones which are not specifically bound to Fc labels or blocking buffer components;
3) after incubation, transfer the supernatant to the plate coated with the target antigen and continue incubation to enable the phage to bind to the target antigen;
4) wash the surface of the solid support with wash buffer to wash away unbound phages;
5) elute positive phages from the target antigen with an eluent;
6) re-infect the host bacterium XL1-blue with the eluted phages, and proliferate the recovered phages; take a small amount of samples for gradient dilution to infect the host bacterium, and coat the cells onto an Amp resistant plate; calculate the number of recovered phages; and
7) repeat steps 1) to 6), usually 3 to 4 rounds of panning until significant increase in phage recovery (number of eluted phages/number of introduced phages).

The enriched phage pool can be used for subsequent monoclonal antibody selection and ELISA/FACS identification.

Raji/Raji-CD19Ko Cell Panning

The Raji-CD19ko cells prepared in Example 1 were used as negative panning cells and Raji cells as positive panning cells for multiple rounds of panning to obtain a phage pool enriched with the target antibody clones.

The brief experimental steps are as follows:

1) well mix the phage pool enriched with specific clones after protein panning (containing $1 \times 10^{12}$ phage particles) with $1 \times 10^7$ negative panning cells Raji-CD19ko, incubate the mixture for 2 h at room temperature on a rotating mixer to allow antibody clones that can bind the negative panning cell line to fully bind to these cells;
2) centrifuge at 1500 rpm for 5 min to precipitate cells, transfer the supernatant to a new tube and mix well with $5 \times 10^6$ Raji cells (CD19-positive cells) to allow binding on a rotating mixer at room temperature for 2 h;
3) wash the cells 6 times with PBS, discard the supernatant each time, and resuspend and centrifuge the cells at 1500 rpm for 5 min to remove unbound phages;
4) elute the positive phages from the target antigen with an eluent;
5) re-infect the host bacteria with the eluted phages, and proliferate the recovered phages; take a small amount of samples for gradient dilution, infect the host bacteria, coat the cells on an Amp resistant plate, and calculate the number of recovered phages; and
6) repeat steps 1) to 5), usually for 3 to 4 rounds, until significant increase in phage recovery (number of eluted phages/number of introduced phages).

The enriched phage pool can be used for further monoclonal antibody selection and ELISA/FACS identification.

Main Materials and Reagents:

Fully human phage antibody libraries, including a native library and a semi-synthetic library;

Helper phage KO7, Thermo/Invitrogen, 18311019;

Human CD19 (20-291) Protein, Fc Tag, ACRObiosystem, CD9-H5251;

Human BCMA/TNFRSF17 Protein, Fc Tag, ACRObiosystem, BC7-H5254;

High binding ELSIA plate, Costar, #3590

Blocking buffer: PBS+3% BSA

Wash buffer: PBS+0.1% Tween20

Eluent: 1 mg/mL Trypsin PBS

Experimental results:

With each of the different antibody libraries, a significant increase in recovery rate was observed in each of the 3 rounds of protein panning (Table 3), demonstrating efficient enrichment of the antibody clones.

TABLE 3

Results of protein panning experiment

| Antibody library | Round | Recovery rate | Enrichment factor |
|---|---|---|---|
| XL-N1-3 | 1st | 1.20E−05 | / |
|  | 2nd | 1.96E−07 | 0.02 |
|  | 3rd | 5.90E−05 | 301.38 |
| XL-N4-6 | 1st | 1.20E−05 | / |
|  | 2nd | 3.00E−07 | 0.03 |
|  | 3rd | 4.71E−05 | 156.69 |
| XL-SS1 | 1st | 1.20E−05 | / |
|  | 2nd | 3.42E−07 | 0.03 |
|  | 3rd | 1.88E−05 | 54.81 |
| XL-SS2 | 1st | 1.20E−05 | / |
|  | 2nd | 3.23E−07 | 0.03 |
|  | 3rd | 1.05E−05 | 32.63 |

It can be seen that after three rounds of panning, antibody enrichment was achieved for each of the different antibody libraries (the recovery rate in the third round was significantly higher than that in the previous round). However, in the subsequent FACS experiments, none of the clones we selected from these phage pools could bind to the Raji cell line with high expression of CD19 antigen, i.e., they could not recognize native CD19 antigen on the cell surface. Therefore, in our subsequent experiments, we isolated specific antibody clones from additional phage antibody libraries using alternating protein and cell panning. Table 4 shows the results of panning using the recombinant CD19 protein and the Raji/Raji-CD19ko cell line together. As can be seen from recovery rate, enrichment was achieved in each of the 5 rounds of panning, and the clones can be used for the subsequent selection of monoclonal antibodies.

TABLE 4

Results of protein/cell panning experiments

| Antibody library | Round | Panning method | Recovery rate | Enrichment factor |
|---|---|---|---|---|
| XL-PSS3 | 1st | Protein | 6.40E−06 | / |
|  | 2nd | Protein | 6.80E−05 | 10.63 |
|  | 3rd | Cell | 2.80E−06 | 0.04 |
|  | 4th | Cell | 1.60E−05 | 5.71 |
|  | 5th | Cell | 1.15E−04 | 7.19 |

TABLE 4-continued

Results of protein/cell panning experiments

| Antibody library | Round | Panning method | Recovery rate | Enrichment factor |
|---|---|---|---|---|
| XL-PSS4 | 1st | Protein | 8.00E−06 | / |
| | 2nd | Protein | 3.32E−05 | 4.15 |
| | 3rd | Cell | 1.20E−05 | 0.36 |
| | 4th | Cell | 3.08E−05 | 2.57 |
| | 5th | Cell | 5.50E−04 | 17.86 |
| XL-PSS5 | 1st | Protein | 1.04E−05 | / |
| | 2nd | Protein | 3.08E−05 | 2.96 |
| | 3rd | Cell | 2.80E−06 | 0.09 |
| | 4th | Cell | 4.12E−05 | 14.71 |
| | / | / | / | / |
| XL-PSS6 | 1st | Protein | 9.20E−06 | / |
| | 2nd | Protein | 4.00E−05 | 4.35 |
| | 3rd | Cell | 2.80E−07 | 0.01 |
| | 4th | Cell | 2.12E−05 | 75.71 |
| | 5th | Cell | 2.85E−04 | 13.44 |
| XL-BSS1 | 1st | Protein | 9.20E−06 | / |
| | 2nd | Protein | 3.72E−04 | 40.43 |
| | 3rd | Cell | 2.80E−06 | 0.01 |
| | 4th | Cell | 2.40E−05 | 8.57 |
| | 5th | Cell | 2.35E−04 | 9.79 |

Example 3. Screening of Specific Clones from Enriched Phage Pool Using Enzyme Linked Immunosorbent Assay (ELISA) and Flow Cytometry (FACS)

Objective and Principle: The phage pool enriched by the affinity panning step comprises various types of phage antibodies: specific clones, non-specific clones and negative clones. In order to obtain specific clones, we needed to isolate monoclonal antibodies, package them into the corresponding phages, and preliminarily screen a large number of monoclonal antibodies by ELISA to select the monoclonal antibodies that specifically bind to CD19 protein. These ELISA-specific clones were further screened by flow cytometry to verify their ability to bind to native CD19 molecules on the cell surface. The specific monoclonal antibody can be subjected to DNA sequencing to determine the sequence of the single chain antibody contained therein.

In ELISA preliminary screening, the streptavidin-biotin binding allowed the biotinylated target protein (CD19-hFc-Bio) and the control protein (BCMA-hFc-Bio) to be closer to native antigen conformation in the reaction solution. Clones that only bound to CD19-hFc-Bio but not to BCMA-hFc-Bio and streptavidin were considered specific. The FACS preliminary screening was performed using a cell line Raji with high expression of CD19 and Raji-CD19ko with knockout of CD19 molecules, and clones that only bind to Raji cells but not to Raji-CD19ko cells were considered specific. Through the two preliminary screenings based on ELISA and FACS respectively, we could obtain candidate antibodies that can not only bind to the recombinantly expressed CD19 protein but also recognize the native CD19 molecules on the cell surface for further screening.

Brief steps of ELISA experiment are as follows:
1) culture and package monoclonal phages by using a deep-well 96-well plate;
2) dilute Strepavidin to 2 μg/mL with PBS, add the diluted Strepavidin at 100 μL/well into a high binding ELISA plate for binding at room temperature for 2 h;
3) discard the coating buffer, and add 250 μL of blocking buffer to each well to block at 4° C. overnight;
4) wash the plate with 250 μL of wash buffer twice;
5) dilute the target protein and control protein with the biotin tag to 2 μg/mL with PBS, and add the diluted protein at 100 μg/well into the ELISA plate pre-coated with strepavidin for binding at room temperature for 1 h;
6) wash the plate with 250 μL of wash buffer twice;
7) add 100 μL of the phage supernatant cultured in the step 1) into wells coated with the target antigen and the control antigen for binding at room temperature for 2 h;
8) wash the plate with 250 μL of wash buffer 4 times;
9) add mouse anti M13 primary antibody diluted in 1:2000 at 100 μL/well and incubate at room temperature for 45 min;
10) wash the plate with 250 μL of wash buffer 4 times;
11) add HRP Donkey anti-Human IgG diluted in 1:1000 at 100 μL/well and incubate at room temperature for 45 min;
12) wash the plate with 250 μL of wash buffer 6 times;
13) add 100 μL of TMB developing substrate for colour development for 5-10 min; and
14) add 100 μL of 2 M $H_2SO_4$ to stop the reaction, and read the results on a microplate reader.

Brief steps of FACS preliminary screening experiment are as follows:
1) culture and package the monoclonal phages using a deep-well 96-well plate;
2) wash Raji and Raji-CD19ko cells with PBS twice, resuspend the cells with PBS to a concentration of $1×10^7$/mL, and sub-package the cells in 50 μL into a 96-well deep well plate;
3) add 50 μL of packaged monoclonal phages (1E11 pfu/mL) into each well, and mix uniformly for binding at 4° C. for 2 h;
4) wash with 200 μL of PBS twice;
5) add mouse anti M13 primary antibody diluted in 1:2000 at 100 μL/well, mix uniformly by blowing-suction and incubate at room temperature for 45 min;
6) wash with 200 μL of PBS twice;
7) add FITC horse anti mouse-IgG (H+L) diluted in 1:300 at 100 μL/well and mix uniformly by blowing-suction and incubate at room temperature for 45 min;
8) wash with 200 μL of PBS twice; finally, resuspend the cells with 200 μL of PBS; and
9) determine the fluorescence intensity of the FITC channel of the sample on a flow cytometer, and analyse the results.

Main Materials and Reagents:
Helper phage KO7, Thermo/Invitrogen, 18311019
Streptavidin, Pierce, 21125
Biotinylated Human CD19, Fc Tag, ultra sensitivity (primary amine labelling), ACRObiosystem, CD9-H8259;
Biotinylated Human BCMA/TNFRSF17 Protein, Fc Tag, Avi Tag (Avitag™), ACRObiosystem, BC7-H82F0;
High binding ELSIA plate, Costar, #3590
Corning 96 Well Clear Round Bottom TC-Treated Microplate, Costar, #3799
Blocking buffer: PBS+3% BSA
Wash buffer: PBS+0.1% Tween20
Soluble mono-component TMB substrate solution, Tiangan, PA-107-02
Anti-M13 Bacteriophage Coat Protein g8p antibody, abcam, ab9225
HRP Goat anti-mouse IgG (minimal x-reactivity) Antibody, Biolegend, 405306
FITC horse anti mouse-IgG (H+L), Vector, FI2000

Figure 4:
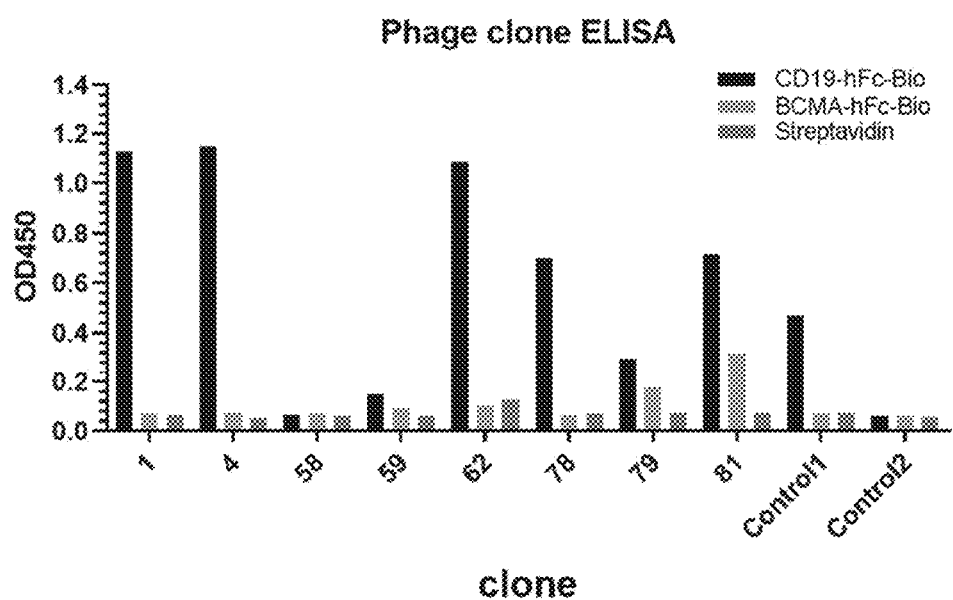
FIG. 4 shows the results of enzyme-linked immunosorbent assay (ELISA) of the screened phage monoclonal antibodies against the target antigen and the control antigens. Control 1 is FMC-63 (humanized mouse anti-human CD19 phage antibody clone); control 2 is a non-CD19-binding scFv phage antibody clone.

Experimental Results:

Monoclonal antibodies were randomly selected from the enriched phage antibody pool, packaged into phages, and the binding of the monoclonal phage to CD19-hFc-Bio protein and BCMA-hFc-Bio protein was detected by phage ELISA to find CD19-specific phage antibody clones. The ELISA results of some clones are shown in FIG. 4. Control 1 is FMC-63 (humanized mouse anti-human CD19 phage antibody clone); and control 2 is non-CD19-bound scFv phage antibody clone. As can be seen from the figure, clones #1, 4, 62, and 78 bound well to the target antigen CD19 (CD19-hFc-Bio) and did not bind to the control antigen BCMA (BCMA-hFc-Bio) and Streptavidin, exhibiting good specificity. Clones #58 and #59 were negative clones in that they did not bind to any one of the target antigen CD19 (CD19-hFc-Bio), the unrelated antigen BCMA (BCMA-hFc-Bio), and Streptavidin. Clones #79 and #81 bound to the target antigen CD19 (CD19-hFc-Bio), but also bound to the control antigen BCMA (BCMA-hFc-Bio), so that they were non-specific clones.

Figure 5:
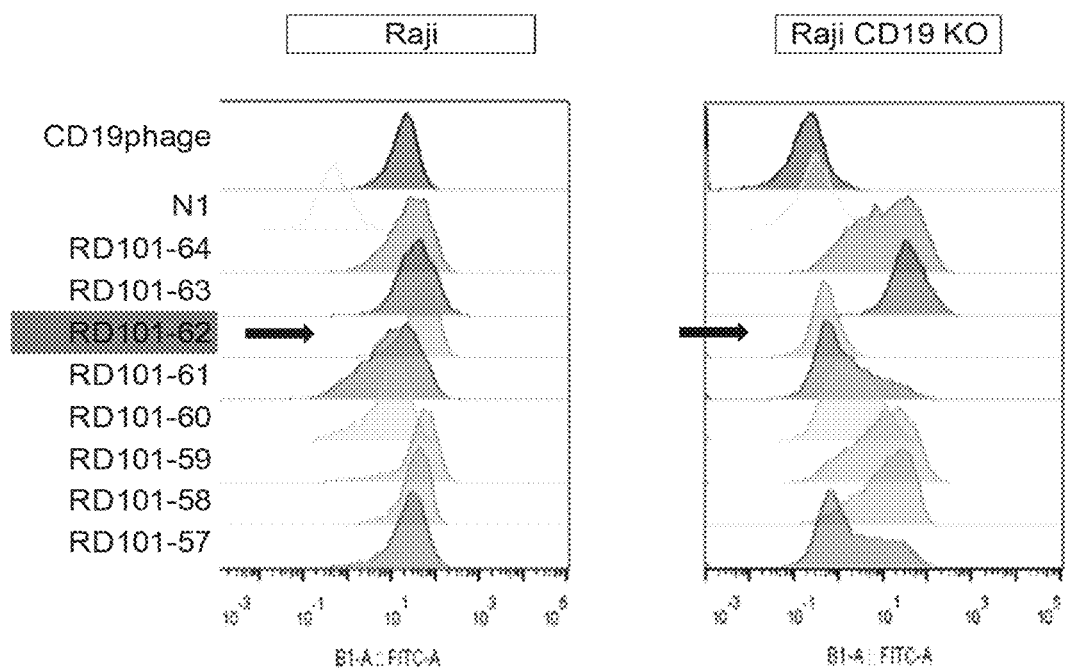
FIG. 5 shows the results of flow cytometry for binding of some phage monoclonal antibodies to Raji and Raji-CD19ko cells.

The results of FACS preliminary screening of some clones are shown in FIG. 5. Among others, clone #62 indicated by the arrow did not bind to Raji-CD19ko but to Raji cells, so that it was a specific clone; the other clones were either non-specific (bound to both cells) or negative (bound to neither cell). A total of 13 specific clones were obtained by ELISA and FACS preliminary screening.

Example 4. Identification of Monoclonal Antibody Specificity by FACS Using Multiple Cell Lines Experimental objective and principle: On the one hand, therapeutic antibodies must have very good target specificity, binding only to the target antigen and not to any unrelated antigen. On the other hand, amino acid sequences of the same antigen on different cell lines may be different (isomers or mutants) or the bound ligands may be different, so that it is also necessary to examine whether our antibodies can bind to various target protein-positive cells. In order to further analyse the specificity and universality of these monoclonal antibodies and identify the optimal candidate clone, we further evaluated the specificity of the preliminarily screened clones by flow cytometry. In this experiment, we used multiple CD19-positive cell lines and multiple CD19-negative cell lines to react with these monoclonal phage antibodies and analysed whether these clones could bind to CD19 antigen on different cell lines and whether they bound non-specifically to other cell lines that do not express CD19. Through this experiment, we obtained a number of clones with excellent specificity. These clones were to be used for constructing into CAR-T for further screening through CAR-T functional experiments.

Figure 6:
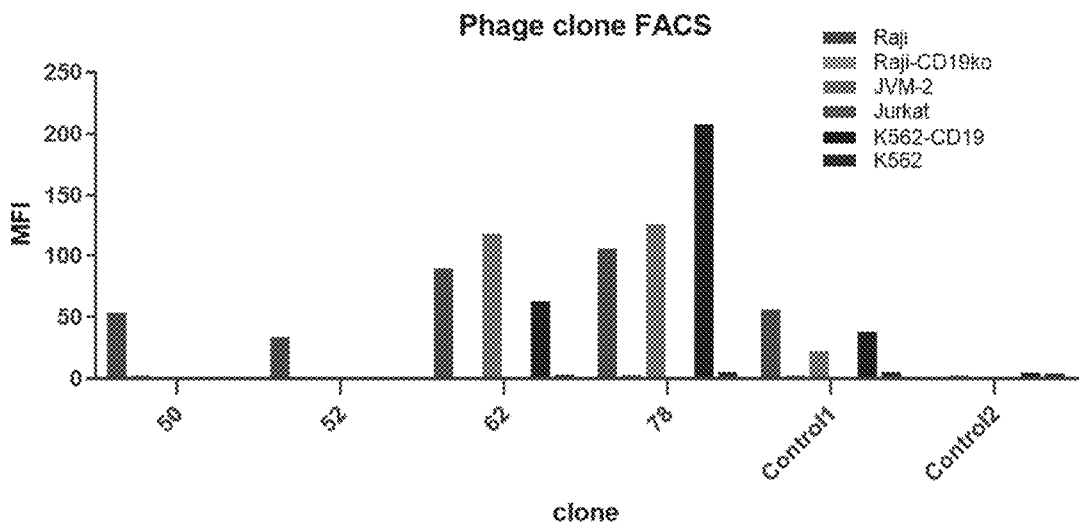
FIG. 6 shows the results (MFI) of flow cytometry for binding of screened phage monoclonal antibodies to various CD19-positive and negative cell lines. Control 1 is FMC-63 (humanized mouse anti-human CD19 phage antibody clone); control 2 is a negative control phage antibody clone.

Experimental method: the same as FACS preliminary screening;
Main samples and reagents:
Raji cell line, CD19-positive cell line;
Raji-CD19ko cell line, CD19-negative cell line;
JVM2, CD19-positive cell line;
Jurkat, CD19-negative cell line;
K562-CD19, CD19-positive cell line;
K562, CD19-negative cell line;
The remaining reagents were the same as in the FACS preliminary screening.
Experimental Results:
Therapeutic antibodies must have very good target specificity. To further analyse the specificity of these monoclonal antibodies, we identified the multiple clones obtained in Example 3 using flow cytometry on more cell lines. The results are shown in Table 5 and FIG. 6. Control 1 is FMC-63 (humanized mouse anti-human CD19 phage antibody clone); control 2 is the negative control phage antibody clone. Clones #62 and #78 bound to all the three CD19-positive cell lines with high median fluorescence intensity (MFI) and bound to none of the CD19-negative cell lines with low MFI, exhibiting good specificity. Although clones #50 and #52 bound to the CD19-positive cell line Raji and did not bind to the CD19 knockout Raji cells (Raji-CD19ko), the CD19-negative cell line Jurkat and the CD19-negative cell line K562, they did not bind to the CD19-positive cell line JVM-2 and the CD19-positive cell line K562-CD19, suggesting that their binding might be non-specific and did not meet the experimental requirements.

TABLE 5

| FACS results (MFI) using multiple cell lines | | | | | | |
|---|---|---|---|---|---|---|
| Clone | Raji | Raji-CD19ko | JVM-2 | Jurkat | K562-CD19 | K562 | Verification result |
| #50 | 53.4 | 2.57 | 0.73 | 0.11 | 1.53 | 1.16 | Nonspecific clone |
| #52 | 33.8 | 1.22 | 0.86 | 0.13 | 1.34 | 1.61 | Nonspecific clone |
| #62 | 89.6 | 1.71 | 118 | 0.56 | 62.7 | 3.52 | Specific clone |
| #78 | 106 | 3.52 | 125 | 0.61 | 208 | 5.3 | Specific clone |
| Control 1 | 55.8 | 1.95 | 22.4 | 0.45 | 38.1 | 5.01 | Specific clone |
| Control 2 | 1.03 | 2.26 | 1.65 | 0.84 | 4.71 | 3.55 | Negative clone |

Example 5. Determination of Binding Epitope for Specific Clones by Competitive Flow Cytometry Assay Experimental Objective and Principle:

Using FMC63, the most widely used anti-CD19 murine clone, CAR-T therapy has achieved impressive clinical results, which may be related to the binding characteristics of this clone to CD19 antigen epitope. We performed this competitive flow cytometry experiment to determine if the specific clones we obtained targeted a CD19 epitope that is also recognized by FMC63. In this experiment, the phage of the clone to be detected was mixed with FMC63 antibody in different concentration gradients in advance and then bound to the positive target cell NALM6. The FITC fluorescence intensity was detected after incubation of the primary antibody mouse anti M13 antibody and the secondary antibody FITC horse anti mouse-IgG (H+L) antibody to determine whether the FMC63 antibody influences the binding of #62 phage and #78 phage to the positive target cell NALM6, thereby determining whether the two clones have similar binding characteristics to those of the murine FMC63-derived scFv.

The basic steps of the competitive flow cytometry experiment are as follows:
1) antibody gradient dilution: dilute FMC63 Ab and CD22 (clone: M971) antibodies from their original concentrations to 400 µg/mL, and then successively dilute to 40 µg/mL, 4 µg/mL, 0.4 µg/mL, 0.04 µg/mL, and 0.004 µg/mL, and add 50 µL of antibody to each well;
2) phage packaging and dilution: as described above, infect and package phage #62, phage #78, and FMC63 with KO7, and dilute them from their original titer to two concentrations of $4\times10^{10}$ pfu/mL and $2\times10^{10}$ pfu/mL, add 50 µL of phage to each well, and mix with the antibody in advance;

3) wash NALM6 cells once with PBS and resuspend the cells in PBS to $6\times10^6$/mL, and add 50 µL of cells and 100 µL of pre-mixed antibody and phage mixture into each well, and mix them uniformly and incubate at 4° C. for 1 h;

4) wash the plate twice with PBS, and then add the mouse anti M13 antibody diluted 1000× with PBS at 100 µL/well and incubate at 4° C. for 0.5 h;

5) wash the plate twice with PBS, and add the FITC horse anti mouse-IgG (H+L) diluted 100× with PBS at 100 µL/well and incubate at 4° C. for 0.5 h;

6) wash the plate twice with PBS, followed by flow cytometry; and 7) analyse data with FLOWJO software, calculate MFI and plot curves with graphpad prism software.

Main Samples and Reagents:
Target cell NALM6
FMC63 Ab and CD22 (clone: M971) antibodies, independently developed by IASO BIO
Helper phage KO7, Thermo/Invitrogen, 18311019
Anti-M13 Bacteriophage Coat Protein g8p antibody, abcam, ab9225
FITC horse anti mouse-IgG (H+L), Vector, FI2000

Figure 7:
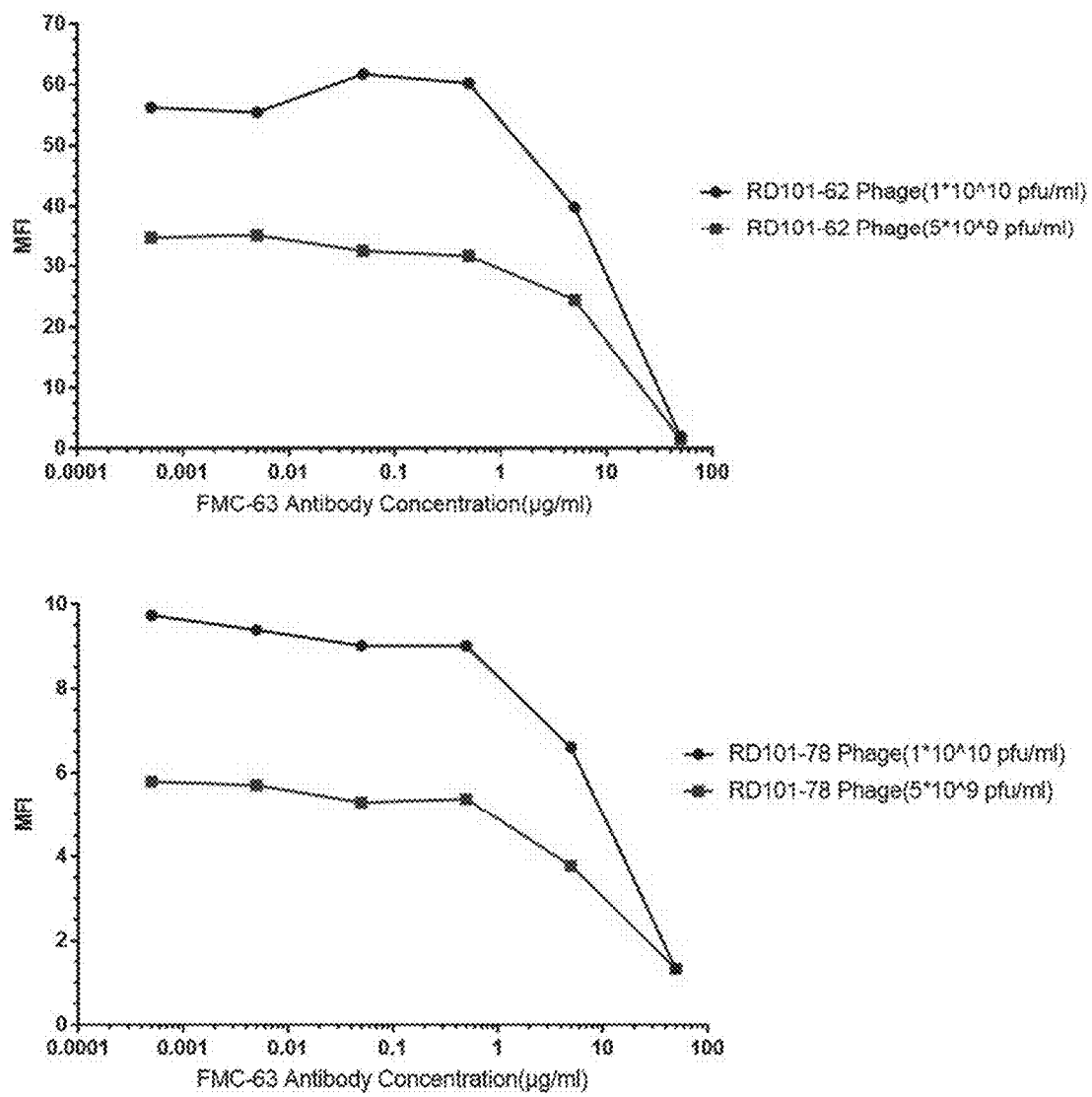
FIG. 7 shows the results of a competitive binding assay of FMC-63 antibody with phages #62, #78, and FMC-63.
Figure 7:
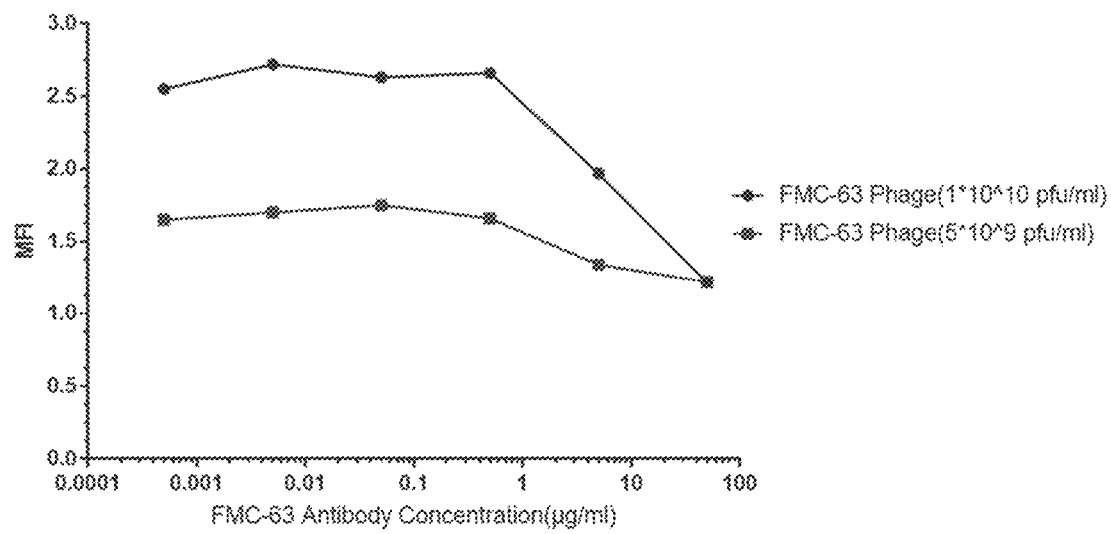
Figure 7:
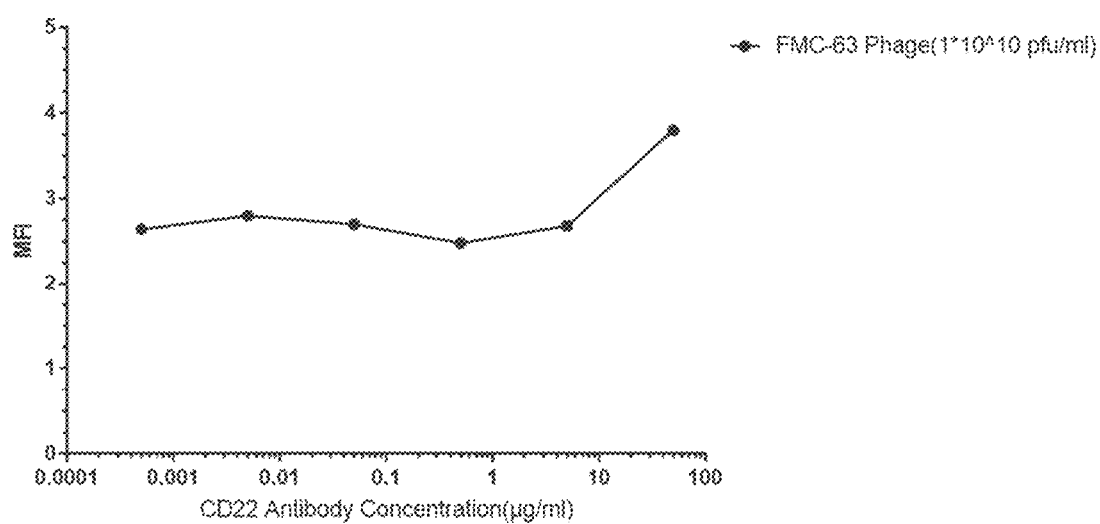

Experimental Results:
The result is shown in FIG. 7. According to the curve plotted based on MFI, with the increase of FMC63 antibody concentration, the MFIs of the #62, #78 and FMC63 phages all decreased, showing competitive inhibition in a dose-dependent manner, whereas CD22 (clone: M971) antibody had no significant effect on the MFI of FMC63 phage, indicating that the antibodies #62, #78 and FMC63 shared the same binding epitopes when they interacted with CD19 antigen, and that #62, #78 and FMC63 might have similar characteristics in binding to CD19 antigen.

Example 6. Screening of CAR Molecules by Reporter Gene Assay

Figure 8:
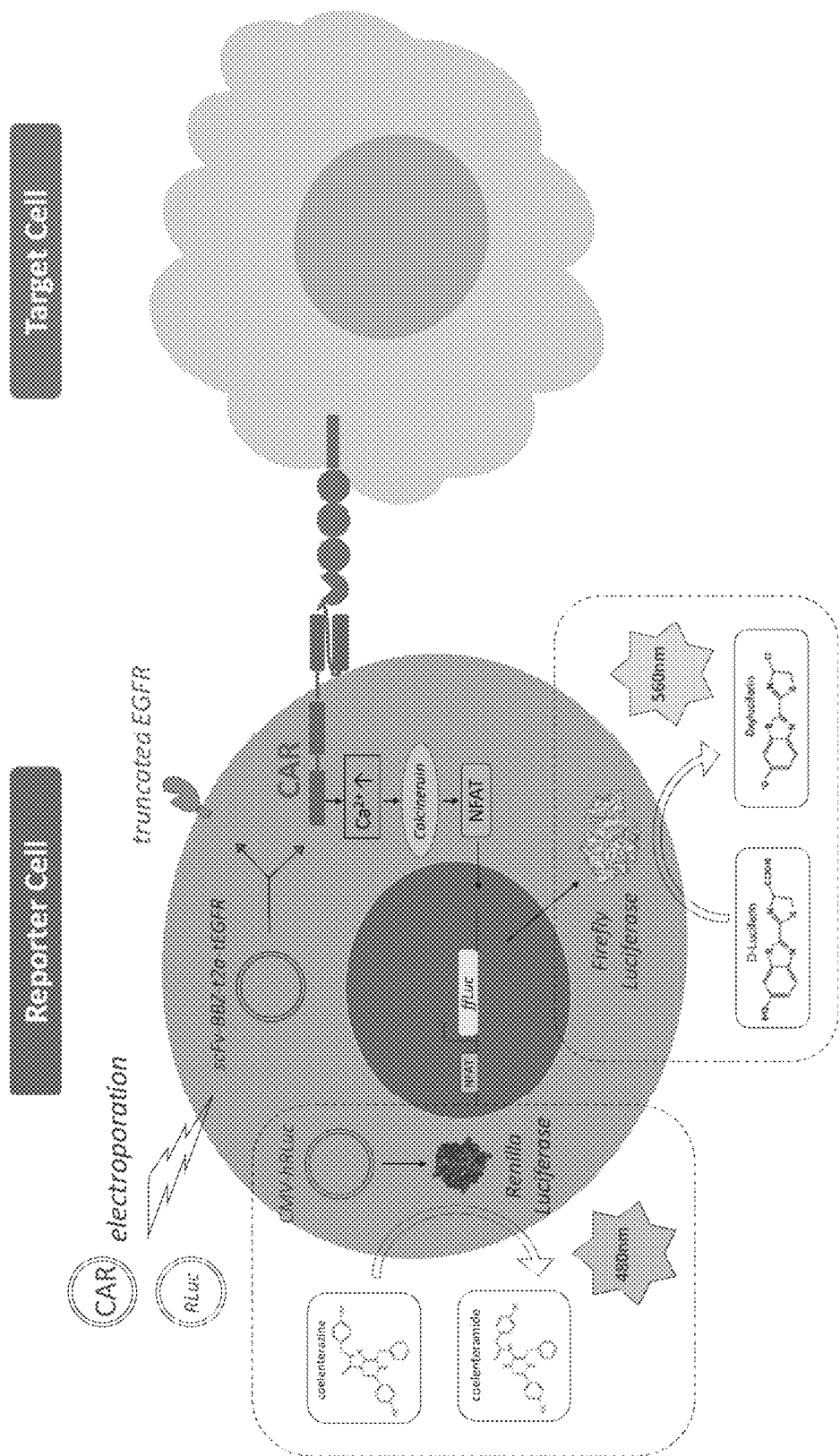
FIG. 8 is a schematic diagram showing the experimental principle of screening CAR molecules by a reporter gene assay.

Experimental Objective and Principle:
To confirm whether the specific clones obtained in Example 4 could specifically recognize target cells and activate CAR-T cells after being constructed into CAR-T, we developed an efficient screening method for CAR-T, namely the reporter gene assay, which works according to the principle shown in FIG. 8. Activation of CAR-T cells is achieved through CD34 and a co-stimulator in the intracellular region of a CAR molecule, wherein CD34 can activate the NFAT signalling pathway in cells, which is a requisite for the activation of CAR-T cells. Therefore, through the NFAT reporter gene assay, CAR molecules capable of activating the NFAT signalling pathway can be screened out. In this experiment, Jurkat cells integrated with the NFAT-ffLuc (ffLuc, firefly luciferase) reporter gene were used as reporter cells. The nucleic acid molecule encoding CAR was transiently expressed on the surface of the report cell by means of plasmid electroporation. After the reporter cell expressing the CAR molecule was incubated with the target cell, the target cell surface antigen could specifically activate the CAR molecule and in turn activate the expression of the reporter gene. The ability of the CAR molecule to activate the NFAT signalling pathway could then be evaluated by detected luciferase activity. The plasmid also includes a sequence encoding truncated EGFR (tEGFR) which, when expressed on the cell surface, can be used to label cells that successfully express CAR. In addition, considering the different electroporation efficiencies of CAR molecules, we used an internal reference plasmid (CMV-hRLuc, encoding renilla luciferase) blended with nucleic acid molecules encoding CAR to calibrate electroporation efficiency. Compared with the traditional method where lentivirus packaging followed by infection of T cells is carried to prepare CAR-T for function detection, the reporter gene method disclosed by the present invention has simple steps, and can be used for quick and efficient preliminary evaluation of the capability and specificity of candidate CAR molecules in tumor cell recognition.

Brief experimental steps of reporter gene assay are as follows:

1) mix the plasmid encoding CAR molecule to be detected and the internal reference plasmid in a fixed ratio, and transfect reporter cells with the mixture by electroporation;

2) 48 h after transfection, take a part of the transfected reporter cells and stain with PE-anti human EGFR antibody, and detect the expression of CAR molecules by flow cytometry;

3) 72 h after transfection, mix the reporter cells and target cells in a ratio of 1:1 and then plate them into a U-bottom 96-well plate and incubate for 24 h; wherein add $3\times10^4$ reporter cells into each well, and set three replicate wells for each target cell; and 4) after incubation, centrifuge the cells at 1000 g at 4° C. for 5 min; remove the culture supernatant, lyse cells using 100 µL of lysis buffer per well, and take 20 µL of cell lysate therefrom for luciferase activity detection.

Main Samples and Reagents:
Target cells Raji, JVM2, REH, K562, Raji-CD19ko;
Internal reference plasmid pGL4.75, Miaoling Biotechnology, P0211;
Electroporation kit, Celetrix, Cat. No. 1207;
PE-anti human EGFR, BioLegend, Cat. No. 352904;
Dual-luciferase detection kit, Yeasen, 11402ES60;
Corning 96 Well Clear Round Bottom TC-Treated Microplate, Costar, #3799.

Figure 9:
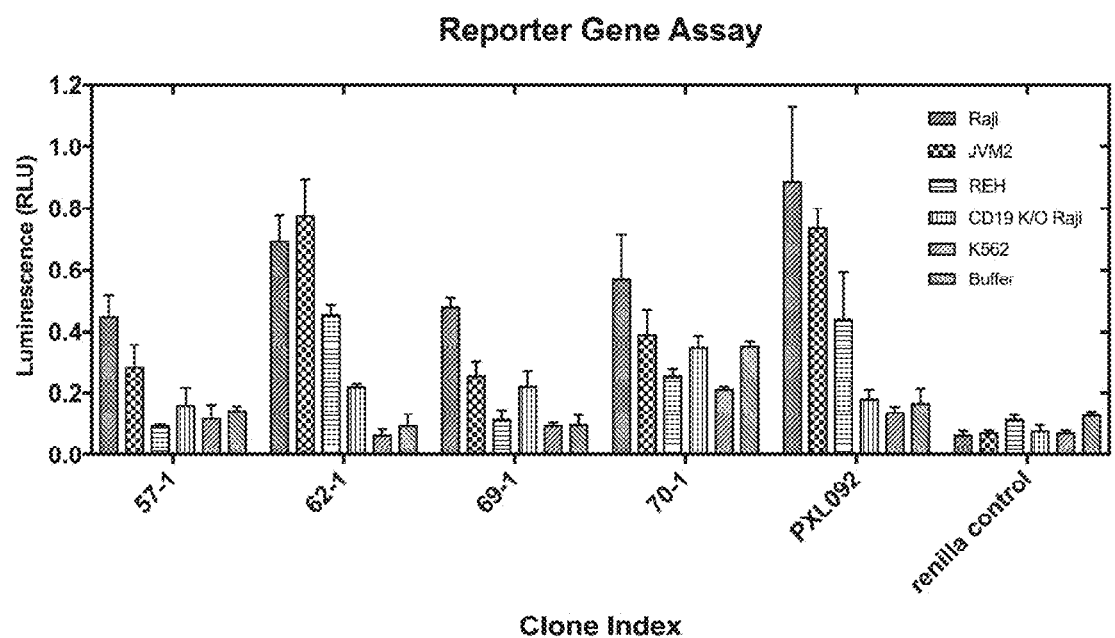
FIG. 9 shows the activation of CAR-T cells constructed in the reporter gene assay by various target cells, and the results are expressed as chemiluminescence generated by luciferase.
Figure 10:
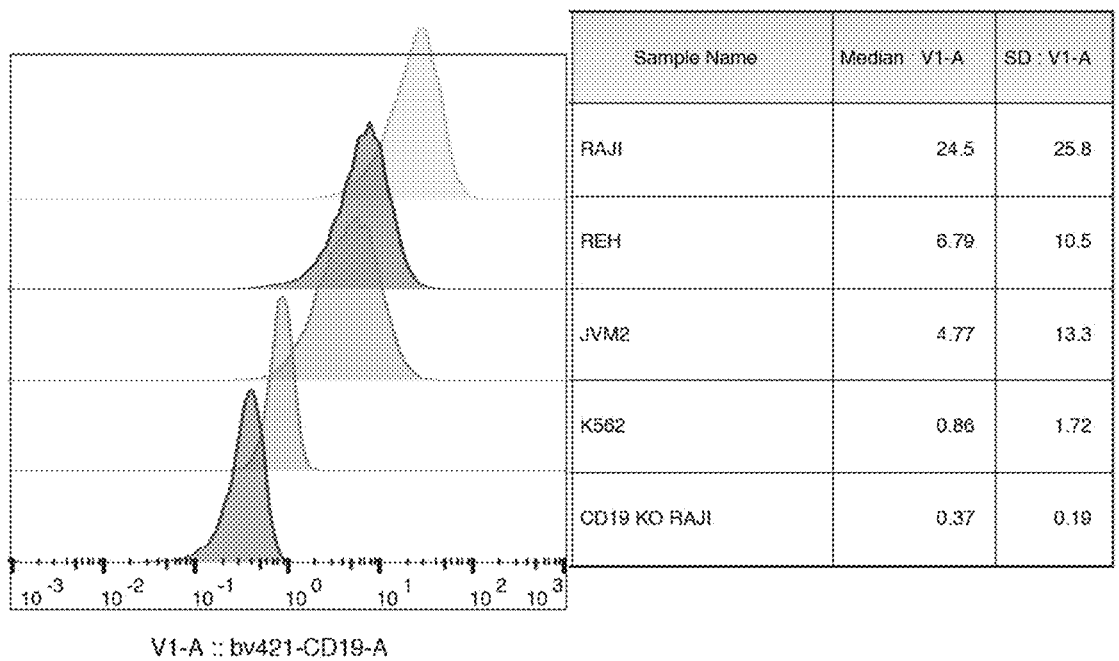
FIG. 10 shows the expression of CD19 on the surfaces of five target cells used in the reporter gene assay.

Experimental Results:
Through the report gene method, the results shown in FIG. 8 were obtained. Among others, Raji, JVM2 and REH were positive target cells expressing CD19 antigen, and they had different CD19 antigen expression densities (as shown in FIG. 9). As negative target cells, Raji-CD19ko and K562 did not express CD19 antigen on the surface. PXL092 was the positive reference CAR molecule that encodes FMC63-bbz. 57-1, 62-1, 69-1, 70-1 were the CAR molecules to be tested, wherein 62-1 was constructed using phage clone 62 described above. Reporter cells expressing CAR molecules on the surface would generate weak background signal when incubated alone (Buffer group). The background signal might be caused by the upstream promoter of the reporter gene or by the spontaneous activation of CAR molecules. Therefore, the higher the background signal is, the greater the possibility of spontaneous activation of CAR molecule will be. When reporter cells were incubated with negative target cells, the resulting signal should be the same as that in the Buffer group if the CAR molecules do not bind non-specifically. When the reporter cells were incubated with positive target cells, the CAR molecule would be specifically activated by the antigen on the surface of positive target cells to generate signals, and the signal intensity was correlated with antigen density. As shown, CAR 62-1 had similar ability to activate the NFAT signalling pathway to that of the control PXL092 and was free of significant non-specific activation related problems. CAR 57-1 and 69-1 could also activate the NFAT signalling pathway, but to a lesser extent than PXL092. CAR 70-1 had a strong background activation signal and had weak specificity to positive target cells.

Example 7. In Vitro Functional Verification of CAR-T Cells

Experimental Objective and Principle:

The functions of CAR molecules with activation function obtained through preliminary screening by the reporter gene method described above were needed to be further verified on CAR-T cells. For this reason, we prepared lentiviral vectors for these clones to transduce T cells to prepare CAR-T cells. The in vitro biological potency of the CAR-T cells was then evaluated by CD107a degranulation assay and in vitro cytotoxicity assay. Through the functional verifications at CAR-T level, we finally selected a candidate single chain antibody clone with ideal efficacy and safety for downstream CAR-T product development.

CD107a Degranulation Assay

CD107a is a marker of intracellular microvesicles, and the CD107a on the cell membrane will increase when the microvesicles loaded with granzyme are fused with the cell membrane. The release of microvesicles can be quantitatively reflected when the recovery of CD107a is blocked by monesin (purchased from BioLegend). When CAR-T is stimulated by the target antigen on the target cell, it will cause the release of granzyme, and the activation of T cells can be demonstrated by the increase of CD107a as detected by flow cytometry.

Brief steps of CD107a degranulation assay are as follows:
1) centrifuge the CAR-T cells to be tested and the target cells at 300 g at room temperature for 5 min respectively, discard the supernatant, and resuspend the cells with T cell culture medium to $1 \times 10^6$ cells/mL;
2) in a 24-well plate, add 500 μL of the CAR-T cells to be tested and 500 μL of the target cells and mix uniformly;
3) to the cells in each well, add 5 μL of PE/Cy7 mouse anti-human CD107a antibody and 1 μL of monensin, and then put the cells in a cell incubator (37° C., 5% $CO_2$) and incubate for 3 h;
4) after incubation, take 500 μL of cell suspension out of the 24-well plate, centrifuge the cells at 300 g at 4° C. for 5 min, discard the supernatant, and wash the cells twice with 1 mL of PBS+1% HAS;
5) resuspend the cells with 100 μL of PBS+1% HSA, and then add 5 μL of APC mouse anti-human CD8 and 5 μL of Alexa Fluor 488 anti-human EGFR antibody (or FITC-CD19 protein) respectively, mix well, and then incubate the cells on ice in the dark for 20 min; and
6) after incubation, wash the cells with 1 mL of PBS+1% HSA 3 times; resuspend the cells with 400 μL of PBS+1% HSA, and then detect by a flow cytometer.

Main Samples and Reagents:
Target cells Raji, REH, NALM6, K562-CD19, K562, Raji-CD19ko;
Monensin, BioLegend, Cat. No. 420701;
PE/Cy7 mouse anti-human CD107a, BD, Cat. No. 561348;
APC mouse anti-human CD8, BD, Cat. No. 555369;
Alexa Fluor 488 anti-human EGFR, BioLegend, Cat. No. 352908;
FITC-CD19 protein, ACro Biosystems, Cat. No. CD9-HF251.

Figure 11:
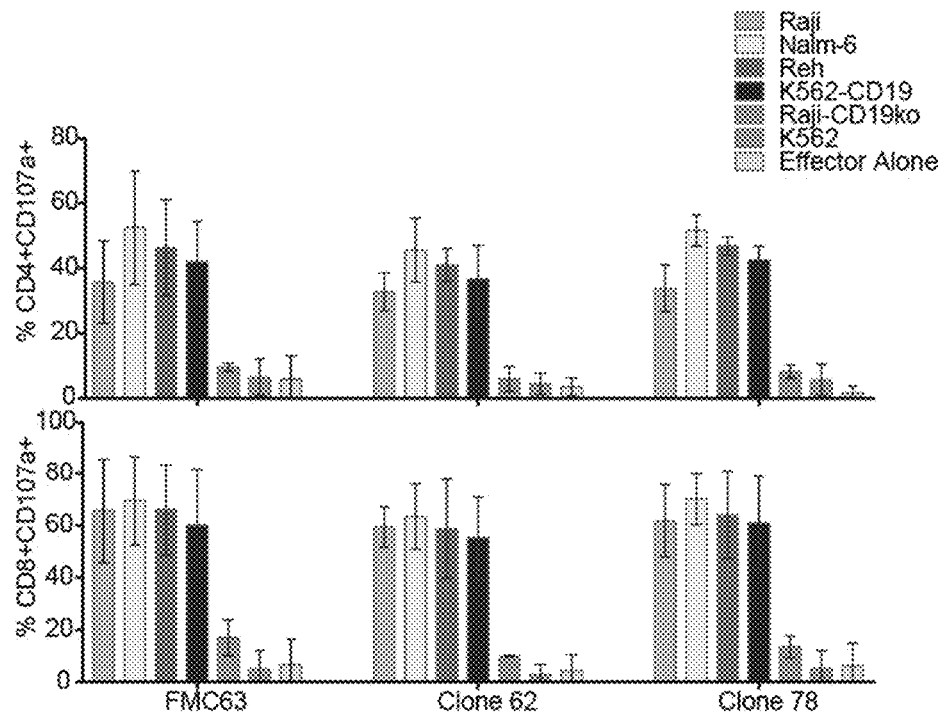
FIG. 11 shows the results of CD107a degranulation of CAR-T cells by different target cells.

Experimental Results:

CAR-T cells were obtained by lentiviral transduction and cultured in vitro for 9-12 days before the CD107a degranulation assay. The CAR-T cells to be detected were incubated with the target cells, monensin and the CD107a antibody for 3 h, wherein the cell density of both the CAR-T cells and the target cells was $5 \times 10^5$ cells/mL. The samples were then labelled with CD8 antibody, EGFR antibody (or CD19-FITC protein) and subjected to flow cytometry. In the FSC: SSC scatter plot, viable cell gate (P1) was selected, and cell debris was removed. For the cells in the P1 gate, monodisperse cell gate (P2) was selected according to FSC-H: SSC-A analysis. Then, CD8-positive cells (P3) were further selected in the P2 gate. Finally, in the P3 gate, the proportion of CD107a-positive cells in the cells that were positive for EGFR antibody or CD19-FITC staining (i.e., CAR-positive cells) was analysed. The results of the analysis are shown in FIG. 11 (results of three independent experiments), suggesting that the CAR-T cells with clones #62 and #78 have similar CD107a degranulation function to that of the control CAR-T cells (FMC63).

In Vitro Cytotoxicity Assay

Experimental objective and principle: With Nalm-6, Reh, Jvm-2, Jeko-1, Bv173 and K562-CD19 as CD19-positive target cells, and K562, Thp-1 and Skm-1 cells as CD19-negative target cells, the in vitro cytotoxicity assay evaluated the antigen-specific cytotoxicity of CD19 CAR-T cells. In particular, the above cells were transduced with lentiviruses respectively to obtain target cells stably expressing firefly luciferase, so that the activity of luciferase in the samples can reflect the number of target cells. The CAR-T cells were incubated with the target cells. When the target cells were killed by the CAR-T cells, luciferase would be released and become rapidly inactivated (the half-life of firefly luciferase is about 0.5 h). If the target cells were not killed or inhibited by the CAR-T cells, more luciferase would be produced as the target cells expanded and continued to express luciferase. Therefore, the cytotoxicity of CAR-T on the target cells could be determined through the activity of luciferase.

Brief steps of in vitro cytotoxicity assay are as follows:
1) centrifuge the above cells respectively at 300 g at room temperature for 5 min, discard the supernatant, and resuspend the cells with T cell culture medium to $2 \times 10^5$ cells/mL; then add 100 μL of the target cells into each well of the 96-well plate;
2) add 100 μL of CAR-T cells into each well of the 96-well plate according to the CAR positive rate of the CAR-T sample to be tested and the effector to target cell ratio, uniformly mix the CAR-T cells with the target cells; and then put the cells into a carbon dioxide incubator and incubate for 24 h; and
3) detect the luciferase activity in the sample in each well using a luciferase detection kit.

Main Samples and Reagents:
Target cells Nalm-6, Reh, Jvm-2, Jeko-1, Bv173, K562-CD19, K562, Thp-1 and Skm-1; Steady-Glo Luciferase Assay System, Promega, Cat. No. E2520.

Experimental Results:

Samples of CAR-T cells were mixed with a fixed number of target cells ($1 \times 10^4$ cells) in an effector to target cell ratio (E: T) of 4:1, incubated for 24 h, and then tested for luciferase activity (RLU) in the sample, wherein control is a control sample containing only target cells. Since luciferase activity can reflect the number of target cells in the sample, the killing/inhibiting ability of CAR-T cells against the target cells can be obtained through the change of luciferase activity in the sample. The lower the luciferase activity reading (RLU) is, the more target cells will be killed.

Figure 12:
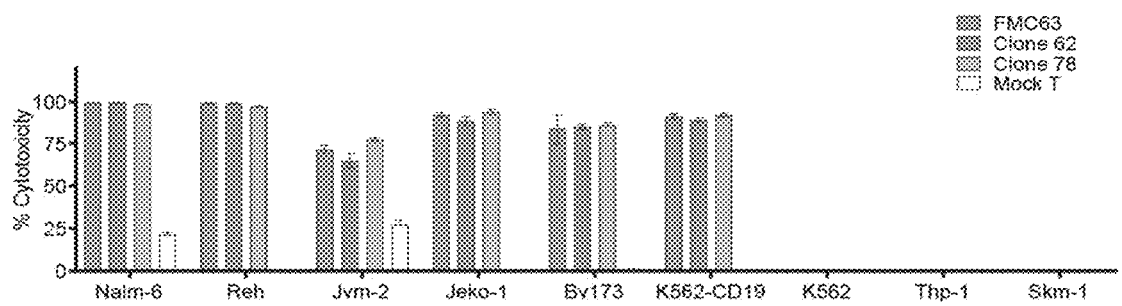
FIG. 12 shows the cytotoxicity of CAR-T cells on a variety of target cells (Nalm-6, Reh, Jvm-2, Jeko-1, Bv173, K562-CD19, K562, Thp-1, and Skm-1).

As shown in FIG. 12, the three groups of CAR-T cell samples (CAR-T cells prepared with #62, #78 clones and the control FMC63) could effectively kill the positive target cells at an effector to target cell ratio of 4:1. T cells showed no significant cytotoxicity when co-incubated with positive target cells. All CAR-T and T cell samples co-incubated with negative target cells showed no significant cytotoxicity. Therefore, all the three groups of CAR-T samples could specifically kill CD19-positive target cells, and showed no non-specific cytotoxicity to CD19-negative target cells.

Experiment on Cytotoxicity after Repeated Stimulation
Experimental Objective and Principle:

Mitomycin-treated target cells (Raji) were mixed with different groups of CD19 CAR-T cells for stimulation for three times, and then the CAR-T cells and target cells were co-incubated to determine whether the cytotoxicity of different scFV CAR-T cells was changed after being stimulated by target cells for multiple times.

Brief steps of experiment on cytotoxicity after repeated stimulation are as follows:
1) centrifuge $4 \times 10^6$ Raji cells at 300 g at room temperature for 5 min;
2) adjust the density of the cells to $0.2 \times 10^6$ cells/mL with the complete medium, add 4 μL of Mitomycin mother liquor (5 μg/μL), well mix them, incubate the cells for 24 h for later use;
3) after 24 h of treatment, take Raji-Mitomycin cells, centrifuge with medium change at 300 g, wash the cells with PBS 6 times, resuspend Raji-Mitomycin cells with CTS culture medium, count cells and adjust the cell density to $2 \times 10^6$ cells/mL for later use; and
4) according to CAR-T's CAR positive rate, take $1 \times 10^5$ CAR+ cells and transfer the cells to a 24-well plate; to each well of CAR-T, add 50 μL of Raji-Mitomycin cells and adjust the effector to target cell ratio (effector cells are based on CAR+) E: T=1:1; make the final incubation volume to 500 μL using CTS complete medium, mix them well, incubate the cells at 37° C. for 72 h with 5% $CO_2$, and count cells; treat target cells (Raji) with mitomycin and detect CAR-T's CAR positive rate again; after repeating the above steps three times, detect CAR-T's CAR positive rate; incubate the CAR-T cells together with the positive target cells Nalm-6 and Reh as well as the negative target cells Thp-1 and Skm-1 and detect for cytotoxicity, with the steps being the same as in the in vitro cytotoxicity experiment.

Figure 13:
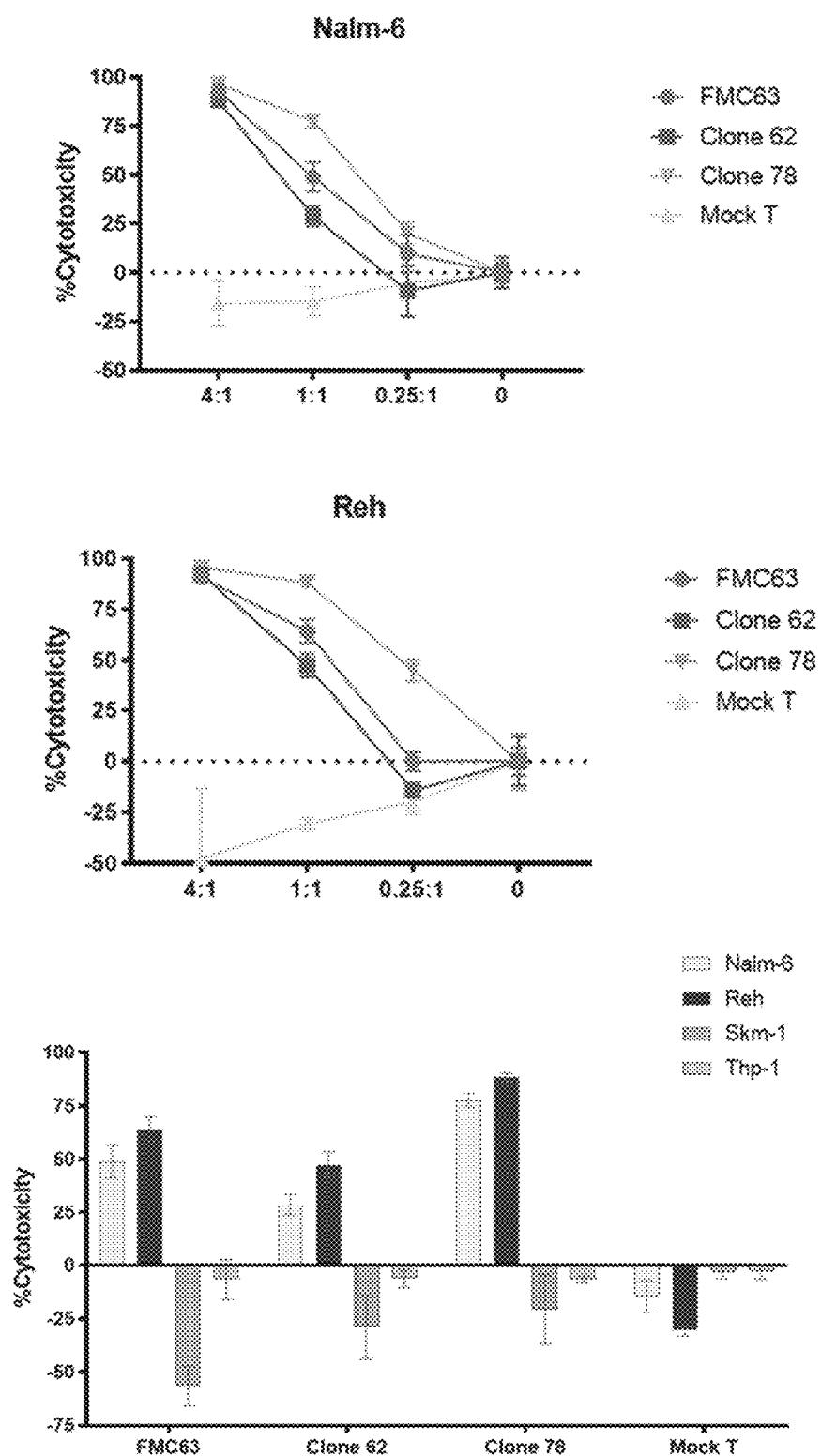
FIG. 13 shows the cytotoxicity on Nalm-6, Reh, Skm-1, and Thp-1 cells by CAR-T cells stimulated twice with mitomycin-treated Raji cells.

Experimental Results:

As shown in FIG. 13, the three groups of CAR-T cell samples (clones #62, #78 and the control FMC63) could effectively kill the positive target cells in a dose-dependent manner, with the cytotoxicity after repeated stimulation being in the order of clone #78 >the control FMC63 >clone #62. There was no significant cytotoxicity when T cells were co-incubated with positive target cells. All CAR-T and T cell samples incubated with negative target cells showed no apparent cytotoxicity. Therefore, the three groups of CAR-T samples could specifically kill CD19-positive target cells after repeated stimulation with positive target cells, and had no non-specific cytotoxicity on CD19-negative target cells.

Example 8. Determination of Affinity of Anti-CD19 scFvs

Experimental Objective and Principle:

The affinity between CD19scFvs and the antigen may have an important effect on cytotoxicity and survival time of CAR-T in patients, and we determined this important property using the Octet molecular interaction technique from ForteBio. Biolayer interferometry used in the Octet system is a label-free technology that provides high-throughput information on biomolecular interactions in real time. The instrument emits white light onto the sensor surface and collects the reflected light. The reflection spectra at different frequencies are affected by the thickness of the optical biofilm of the biosensor. The reflected light at some frequencies forms constructive interference (blue) while others are subjected to destructive interference (red). These interferences are detected by the spectrometer to form an interference spectrum that is displayed as the phase shift intensity (nm) of the interference spectrum. Therefore, once the number of molecules bound to the surface of the sensor increases or decreases, the spectrometer will detect the shift of the interference spectrum in real time, and this shift directly reflects the thickness of the biofilm on the surface of the sensor, from which high-quality data on biomolecular interaction can be obtained, so as to determine the kinetic parameters of biomolecular interaction (Kon, Kdis and KD), which will provide important information for research and development processes.

Figure 14:
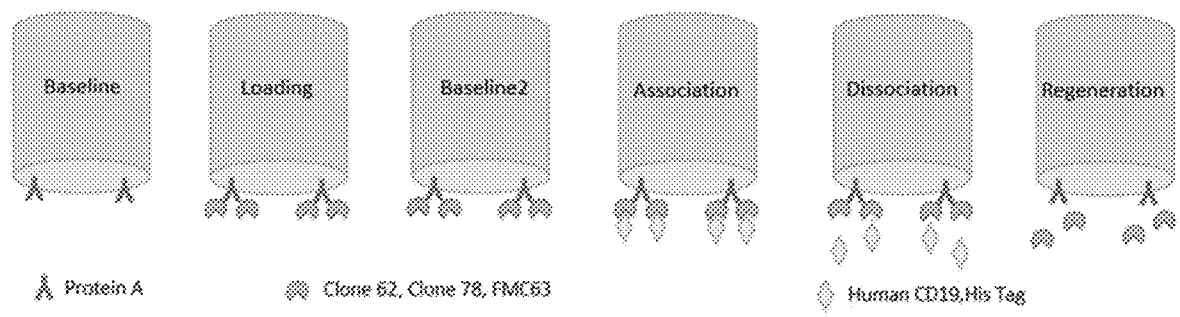
FIG. 14 is a schematic diagram showing the process of determining the affinity of FMC-63, #62, and #78 scFvs to CD19 antigen.

Brief experimental steps are as shown in FIG. 14:
1) dilute anti-CD19 scFv-rFcs to 20 μg/mL with loading buffer (1×PBS, pH 7.4, 0.01% BSA and 0.02% Tween 20) and load the antibody onto the biosensor at about 0.8 nM;
2) monitor the binding kinetics of CD19 antigen at various antigen concentrations (400 to 12.5 nM) after the 60 s equilibration phase, for up to 160 s for association and up to 300 s for dissociation at each concentration, respectively;
3) regenerate the chips by washing 3 times with 10 mM Glycine-HCl (pH 1.5); and
4) analyze association rate constant by using a 1:1 binding site model (Biacore X-100 evaluation software).

Figure 15:
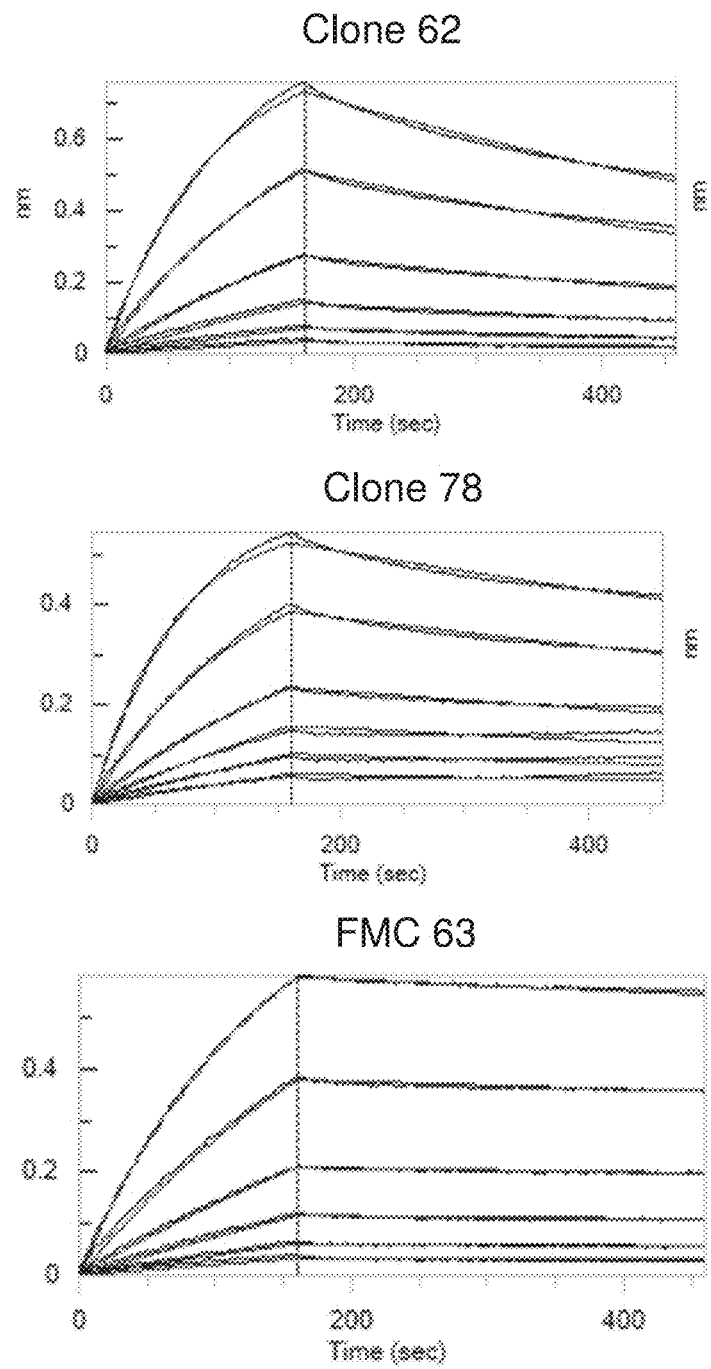
FIG. 15 shows the dynamic binding curves and parameters KD, kon, and kdis in the affinity assay of FMC-63, #62, #78scFv to CD19 antigen.

Experimental Results:

Affinity refers to the intensity of binding of an individual molecule to its ligand, which is usually determined and reported by the equilibrium dissociation constant (KD). The equilibrium dissociation constant can be used to evaluate and rank the intensity of interactions between two molecules. Binding of an antibody to its antigen is a reversible process, and the rate of binding reaction is proportional to the concentration of the reactants. A smaller KD value indicates a greater affinity of the antibody to its target. As shown in FIG. 15, FMC63, #62, #78 can all bind to CD19 antigen with the following order of affinity: FMC63 > #78 > #62.

Example 9. Membrane Proteome Array

Experimental Objective and Principle:

Membrane proteome array (MPA) is a high throughput, cell-based platform for identifying isolated antibodies that bind to membrane proteins and the targets of other ligands. Membrane proteins account for about one-fourth of all proteins encoded by the human genome and are usually folded into complex conformational structures that are difficult to remain outside the cell. The key feature of MPA is that it allows membrane proteins to be expressed and tested individually in their native state directly in cells, thereby maintaining their structural integrity and native post-translational modifications. MPA uses the largest membrane protein library assembled to date and represents more than 5,000 unique membrane proteins. Using the MPA platform, we tested the specificity of #78 to verify whether it non-specifically binds to antigens other than CD19 and to assess its off-target risks.

The brief experimental steps are as follows:
1) MPA contains about 5000 different membrane protein clones, accounting for more than 90% of the human membrane proteome, with each clone overexpressed in HEK-293T cells comprising a cDNA plasmid, and the plasmid was independently used for transfection in separate wells of a 384-well cell culture plate, with an incubation time of 36 h to ensure the expression of membrane proteins;
2) prior to specificity test on MPA, determine the test concentrations of antibody #78 for screening on HEK-293T and QT6 cells expressing positive (ProteinA) and negative (mock transfection) controls by flow cytometry using AlexaFluor 647-labelled secondary antibody;
3) dilute Clone 78 antibody to 20 μg/mL and test the entire protein library for binding activity using the above secondary antibody on IntellicytiQue; to ensure plate-to-plate compatibility and repeatability, include both positive and negative controls for each array plate; and
4) after serial dilution of antibody #78, reconfirm whether each target determined by MPA screening can bind in a repeatable and dose-dependent manner by another flow cytometry assay, and verify the identity of the target by sequencing.

Main Samples and Reagents:
Cell lines: HEK-293T, Q6T
Alexa Fluor target identity Affiniti Pure F (ab') 2 Fragment Goat Anti-Rabbit IgG, Fc fragment specific, Jackson ImmunoResearch, 111-606-046
Goat Serum, Sigma, G6767

Figure 16:
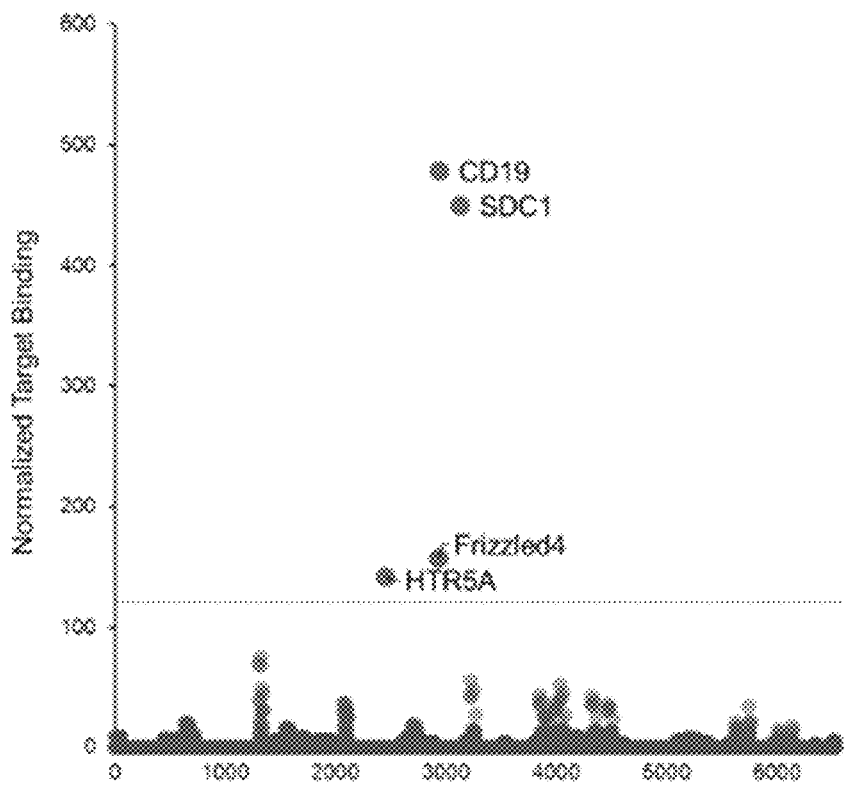
FIG. 16 shows the results of a membrane proteome array (MPA) experiment for antibody #78.
Figure 16:
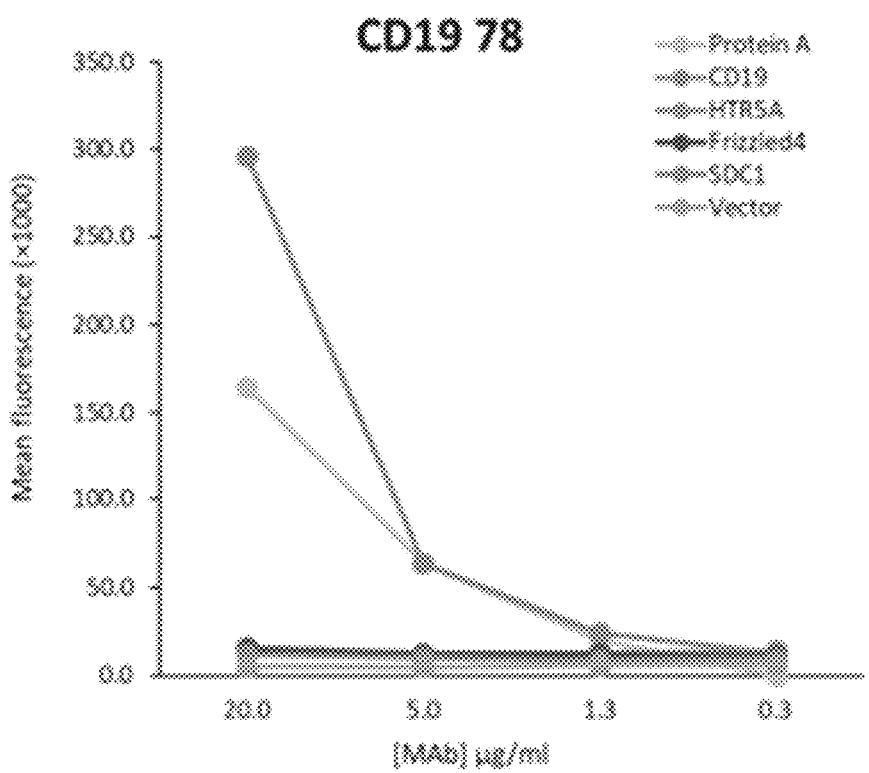

Experimental Results:
As shown in FIG. 16, during the preliminary screening stage of the test, antibody #78 did not specifically bind to most of the 5000 membrane proteins, but bound to HEK-293T cells with high expression of SDC1, Fizzled 4 and HTR5A. To verify the repeatability of this binding, we diluted the antibody #78 with a concentration gradient and repeated the experiment, which showed that the antibody #78 could bind to HEK-293T cells with high expression of CD19 and the positive control (ProteinA), and the mean fluorescence intensity of its binding was dose-dependent. In the verification experiment, the antibody #78 did not bind to HEK-293T cells with high expression of SDC1, Frizzled 4, and TR5A at any concentration, proving that the antibody #78 had good specificity, less off-target risk and good safety in patients.

In the present invention, the fully human phage was used for antibody screening to directly obtain the fully human monoclonal antibody. Compare with the traditional hybridoma technology, the present invention omits the difficult humanization step of murine antibody, and the fully human antibody has lower immunogenicity than the humanized murine antibody, which indicates higher application potential in antibody drugs or CAR-T.

During antibody screening, we found that none of the antibody clones screened directly using the recombinantly expressed CD19 protein could bind to the cell line Raji with high expression of CD19. This might be due to the large difference in conformation and accessible epitope between the recombinantly expressed CD19 protein antigen and the native CD19 on the cell membrane surface. To solve this problem, we prepared the Raji-CD19ko cell line with CD19 gene knockout using CRISPR technology. By using the method of protein/cell line alternating panning, phage antibodies that could simultaneously bind to the recombinantly expressed CD19 protein and Raji cells were enriched, from which monoclonal antibodies that specifically bind to CD19 antigen on the cell membrane surface were screened out.

With respect to development procedure, through antibody screening/specificity identification at the phage level, specific antibody clones were quickly and efficiently screened out, which was directly followed by CAR-T function test to identify the optimal candidate antibody. This procedure bypasses the time-consuming and labor-intensive antibody protein expression and function identification experiments, and optimizes the antibody screening procedure with the purpose of CAR-T development. This not only guarantees the research quality, but also improves the research and development efficiency.

REFERENCES

1. Albert T. Gacerezl, Benjamine Arellanol, and Charles L. Sontman, How chimeric antigen receptor design affects adoptive T cell therapy, Cell Physiol. 2016 December; 231 (12): 2590-2598. doi: 10.1002/jcp.25419
2. Carolina Berger, Mary E. Flowers, Edus H. Warren, and Stanley R. Riddell, Analysis of transgene-specific immune responses that limit the in vivo persistence of adoptively transferred HSV-TK-modified donor T cells after allogeneic hematopoietic cell transplantation, Blood. 2006 Mar. 15; 107 (6): 2294-302. Epub 2005 Nov. 10.
3. Daniel Sommermeyer1. Stanley R. Riddell et. al, Fully human CD19-specific chimeric antigen receptors for T-cell therapy, Leukemia. 2017 October; 31 (10): 2191-2199. doi: 10.1038/leu.2017.57.
4. Gacerez AT. Hua CK. Ackerman ME, Sentman CL. Chimeric antigen receptors with human scFvs preferentially induce T cell anti-tumor activity against tumors with high B7H6 expression, Cancer Immunol Immunother. 2018 May: 67 (5): 749-759. doi: 10.1007/s00262-018-2124-1
5. Jiasheng Wang. Yongxian Hu, and He Huang. Acute lymphoblastic leukemia relapse after CD19-targeted chimeric antigen receptor T cell therapy, Volume 102, PP1-10, December 2017 Journal of Leukocyte Biology
6. JieXua, Sai-Juan Chen et. al. Exploratory trial of a biepitopic CAR T-targeting B cell maturation antigen in relapsed/refractory multiple myeloma. Proc Natl Acad Sci USA. 2019 Apr. 15. pii: 201819745. doi: 10.1073/pnas.1819745116
7. Phage display-methods and protocols, ISSN 1064-3745 ISSN 1940-6029 (electronic) Methods in Molecular Biology ISBN 978-1-4939-7446-7 ISBN 978-1-4939-7447-4 (eBook), DOI 10.1007/978-1-4939-7447-4
8. Lamers C H, Gratama J W et. al, Immune responses to transgene and retroviral vector in patients treated with ex vivo-engineered T cells. Blood. 2011 Jan. 6;117 (1): 72-82. doi: 10.1182/blood-2010-07-294520.
9. Marcela V. Maus1 and Carl H. June, Making Better Chimeric Antigen Receptors for Adoptive T-cell Therapy, Clin Cancer Res. 2016 Apr. 15: 22 (8): 1875-1884. doi: 10.1158/1078-0432.CCR-15-1433.
10. Sauna Z E. Rosenberg A S et. al, Evaluating and Mitigating the Immunogenicity of Therapeutic Proteins. Trends Biotechnol. 2018 October; 36 (10): 1068-1084
11. Rydzek J, Hudecek M et. al, tigen Receptor Library Screening Using a Novel NF-κB/NFAT Reporter Cell Platform, Mol Ther. 2019 Feb. 6: 27 (2): 287-29.

The invention claimed is:

1. A fully human antibody targeting CD19 or a single chain antibody or an antigen binding fragment thereof, wherein the fully human antibody or the single chain antibody or antigen binding fragment thereof comprises a light chain variable region comprising LCDR1, LCDR2, and LCDR3, and a heavy chain variable region comprising HCDR1, HCDR2, and HCDR3, and the LCDR1, LCDR2, LCDR3, HCDR1, HCDR2, and HCDR3 are selected from the group consisting of:
   (1) the amino acid sequence of the LCDR1 is SSNI-GAGYD (SEQ ID NO:16);
   the amino acid sequence of the LCDR2 is ENT;
   the amino acid sequence of the LCDR3 is QSYDSSLSGWRV (SEQ ID NO:17);
   the amino acid sequence of the HCDR1 is GYSFTNSW (SEQ ID NO:13);
   the amino acid sequence of the HCDR2 is IYPDDSDT (SEQ ID NO:14); and
   the amino acid sequence of the HCDR3 is ARQSTYIYG-GYYDT (SEQ ID NO:15); and
   (2) the amino acid sequence of the LCDR1 is SSNIGNNA (SEQ ID NO:21);
   the amino acid sequence of the LCDR2 is YDD;
   the amino acid sequence of the LCDR3 is AAWDD-SLNGWV (SEQ ID NO:22);
   the amino acid sequence of the HCDR1 is GYSFTSYW (SEQ ID NO:18);
   the amino acid sequence of the HCDR2 is IYPGDSDT (SEQ ID NO:19); and
   the amino acid sequence of the HCDR3 is ARLSYSWSS-WYWDF (SEQ ID NO:20).

2. The fully human antibody or the single chain antibody or antigen binding fragment thereof according to claim 1, wherein the light chain variable region comprises the amino acid sequence set forth in SEQ ID NO: 8, and the heavy chain variable region comprises the amino acid sequence set forth in SEQ ID NO: 9; or the light chain variable region comprises the amino acid sequence set forth in SEQ ID NO: 11, and the heavy chain variable region comprises the amino acid sequence set forth in SEQ ID NO: 12.

3. The fully human antibody or the single chain antibody or antigen binding fragment thereof according to claim 1, wherein the single chain antibody comprises the amino acid sequence set forth in SEQ ID NO: 7 or 10.

4. A chimeric antigen receptor targeting CD19, comprising a single chain antibody targeting CD19, wherein the single chain antibody comprises a light chain variable region comprising LCDR1, LCDR2, and LCDR3, and a heavy chain variable region comprising HCDR1, HCDR2, and HCDR3, wherein the LCDR1, LCDR2, LCDR3, HCDR1, HCDR2, and HCDR3 are selected from the group consisting of:
   (1) the amino acid sequence of the LCDR1 is SSNI-GAGYD (SEQ ID NO:16);
   the amino acid sequence of the LCDR2 is ENT;
   the amino acid sequence of the LCDR3 is QSYDSSLSGWRV (SEQ ID NO: 17);
   the amino acid sequence of the HCDR1 is GYSFTNSW (SEQ ID NO:13);
   the amino acid sequence of the HCDR2 is IYPDDSDT (SEQ ID NO:14); and
   the amino acid sequence of the HCDR3 is ARQSTYIYG-GYYDT (SEQ ID NO:15); and
   (2) the amino acid sequence of the LCDR1 is SSNIGNNA (SEQ ID NO:21);
   the amino acid sequence of the LCDR2 is YDD;
   the amino acid sequence of the LCDR3 is AAWDD-SLNGWV (SEQ ID NO:22);
   the amino acid sequence of the HCDR1 is GYSFTSYW (SEQ ID NO:18);
   the amino acid sequence of the HCDR2 is IYPGDSDT (SEQ ID NO:19); and
   the amino acid sequence of the HCDR3 is ARLSYSWSS-WYWDF (SEQ ID NO: 20).

5. The chimeric antigen receptor according to claim 4, wherein the light chain variable region comprises the amino acid sequence set forth in SEQ ID NO: 8, and the heavy chain variable region comprises the amino acid sequence set forth in SEQ ID NO: 9; or the light chain variable region comprises the amino acid sequence set forth in SEQ ID NO: 11, and the heavy chain variable region comprises the amino acid sequence set forth in SEQ ID NO: 12.

6. The chimeric antigen receptor according to claim 4, wherein the single chain antibody comprises the amino acid sequence set forth in SEQ ID NO: 7 or 10.

7. A modified T cell expressing the chimeric antigen receptor according to claim 4.

8. A drug for treating a tumor expressing CD19 on the tumor cell surface, the drug comprising the T cell according to claim 7.

9. An isolated nucleic acid molecule encoding the fully human antibody or the single chain antibody or the antigen binding fragment thereof according to claim 1.

10. The nucleic acid molecule according to claim 9, wherein a sequence encoding the light chain variable region of the fully human antibody comprises the nucleotide sequence set forth in SEQ ID NO: 2, and a sequence encoding the heavy chain variable region comprises the nucleotide sequence set forth in SEQ ID NO: 3; or a sequence encoding the light chain variable region of the fully human antibody comprises the nucleotide sequence set forth in SEQ ID NO: 5, and a sequence encoding the heavy chain variable region comprises the nucleotide sequence set forth in SEQ ID NO: 6.

11. The nucleic acid molecule according to claim 9, wherein a sequence encoding the single chain antibody comprises the nucleotide sequence set forth in SEQ ID NO: 1 or 4.

12. An expression vector comprising the nucleic acid molecule according to claim 10.

13. The expression vector according to claim 12, further comprising a sequence encoding EGFR or truncated EGFR.

14. An expression vector comprising the nucleic acid molecule according to claim 11.

15. The expression vector according to claim 14, further comprising a sequence encoding EGFR or truncated EGFR.

16. A method for treating a patient with a tumor comprising cells expressing CD19 on their cell surface, comprising administrating to the patient an effective amount of the modified T cell according to claim 7.

17. A chimeric antigen receptor targeting CD19, comprising a single chain antibody targeting CD19, wherein the single chain antibody comprises a light chain variable region comprising LCDR1, LCDR2, and LCDR3, and a heavy chain variable region comprising HCDR1, HCDR2, and HCDR3, wherein:
   the amino acid sequence of the LCDR1 is SSNIGNNA (SEQ ID NO:21);
   the amino acid sequence of the LCDR2 is YDD;
   the amino acid sequence of the LCDR3 is AAWDD-SLNGWV (SEQ ID NO:22);
   the amino acid sequence of the HCDR1 is GYSFTSYW (SEQ ID NO:18);

the amino acid sequence of the HCDR2 is IYPGDSDT (SEQ ID NO: 19); and the amino acid sequence of the HCDR3 is ARLSYSWSS-WYWDF (SEQ ID NO:20).

18. The chimeric antigen receptor according to claim 17, wherein the light chain variable region comprises the amino acid sequence set forth in SEQ ID NO:11, and the heavy chain variable region comprises the amino acid sequence set forth in SEQ ID NO:12.

19. The chimeric antigen receptor according to claim 17, wherein the single chain antibody comprises the amino acid sequence set forth in SEQ ID NO:10.

20. A modified T cell expressing the chimeric antigen receptor according to claim 17.

* * * * *